US012125181B2

(12) United States Patent
Inada et al.

(10) Patent No.: US 12,125,181 B2
(45) Date of Patent: Oct. 22, 2024

(54) IMAGE GENERATION DEVICE AND IMAGE GENERATION METHOD

(71) Applicant: Sony Interactive Entertainment Inc., Tokyo (JP)

(72) Inventors: Tetsugo Inada, Tokyo (JP); Akio Ohba, Tokyo (JP); Takayuki Shinohara, Tokyo (JP); Norihide Kaneko, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/246,242

(22) PCT Filed: Sep. 29, 2020

(86) PCT No.: PCT/JP2020/036962
§ 371 (c)(1),
(2) Date: Mar. 22, 2023

(87) PCT Pub. No.: WO2022/070270
PCT Pub. Date: Apr. 7, 2022

(65) Prior Publication Data
US 2023/0306676 A1 Sep. 28, 2023

(51) Int. Cl.
*G06T 5/80* (2024.01)
*G06F 3/01* (2006.01)
(Continued)

(52) U.S. Cl.
CPC ............... *G06T 5/80* (2024.01); *G06F 3/013* (2013.01); *G06T 7/12* (2017.01); *G06T 7/70* (2017.01);
(Continued)

(58) Field of Classification Search
CPC .. G06T 7/90; G06T 3/18; G06T 15/06; G06T 5/80; G06T 7/12; G06T 7/70; G02B 27/0172; G02B 3/013; G06F 3/013
See application file for complete search history.

(56) References Cited

U.S. PATENT DOCUMENTS

| 10,156,724 | B2 | 12/2018 | Shimazu |
| 10,277,891 | B2 | 4/2019 | Kato |

(Continued)

FOREIGN PATENT DOCUMENTS

| JP | 2016063391 A | 4/2016 |
| JP | 2017158153 A | 9/2017 |

(Continued)

OTHER PUBLICATIONS

International Search Report for corresponding PCT Application No. PCT/JP2020/036962, 6 pages, dated Dec. 28, 2023.
(Continued)

*Primary Examiner* — Xuemei Zheng
(74) *Attorney, Agent, or Firm* — Matthew B. Dernier, Esq.

(57) ABSTRACT

An image generation device divides a distorted-image plane into pixel blocks in order to generate a distorted image in consideration of the distortion and chromatic aberration of an eyepiece. In the plane of a source image, the image generation device determines individual RGB sample positions included in the pixel blocks, sets a bounding rectangle containing the individual RGB sample positions, and determines, for example, computation target pixels corresponding to the bounding rectangle. The image generation device calculates the pixel values of, for example, the computation target pixels, interpolates and samples the calculated pixel values, and regards the results of interpolation and sampling as the pixel values of the distorted image.

11 Claims, 14 Drawing Sheets

(51) Int. Cl.
    *G06T 7/12*     (2017.01)
    *G06T 7/70*     (2017.01)
    *G06T 7/90*     (2017.01)
    *G06T 15/06*     (2011.01)

(52) U.S. Cl.
    CPC ............... *G06T 7/90* (2017.01); *G06T 15/06* (2013.01); *G06T 2207/10021* (2013.01); *G06T 2207/10024* (2013.01); *G06T 2207/20021* (2013.01); *G06T 2210/12* (2013.01)

(56) References Cited

U.S. PATENT DOCUMENTS

| | | | |
|---|---|---|---|
| 11,138,800 B1* | 10/2021 | Seiler | G06T 15/08 |
| 2016/0091720 A1* | 3/2016 | Stafford | G02B 27/0172 |
| | | | 345/8 |
| 2017/0257621 A1 | 9/2017 | Kato | |
| 2018/0074321 A1* | 3/2018 | Shimazu | G02B 27/02 |
| 2018/0184077 A1 | 6/2018 | Kato | |
| 2018/0322669 A1 | 11/2018 | Elliot | |
| 2022/0113543 A1 | 4/2022 | Ohba | |
| 2022/0113794 A1 | 4/2022 | Ohba | |
| 2022/0146828 A1 | 5/2022 | Ohba | |
| 2024/0070829 A1* | 2/2024 | Pohl | G06T 5/80 |

FOREIGN PATENT DOCUMENTS

| | | |
|---|---|---|
| JP | 2018110295 A | 7/2018 |
| JP | 2019029721 A1 | 2/2019 |
| JP | 2019045679 A | 3/2019 |
| WO | 2016181909 A1 | 11/2016 |
| WO | 2020170454 A1 | 8/2020 |
| WO | 2020170455 A1 | 8/2020 |
| WO | 2020170456 A1 | 8/2020 |

OTHER PUBLICATIONS

Decision to Grant a Patent for corresponding JP Application No. 2022-553270, 4 pages, dated Jul. 10, 2024.

* cited by examiner

IMAGE GENERATION DEVICE AND IMAGE GENERATION METHOD

TECHNICAL FIELD

The present invention relates to an image generation device and an image generation method that generate an image to be viewed through an eyepiece.

BACKGROUND ART

An image display system enabling a user to view a target space from a free viewpoint is now widely used. For example, electronic content for implementing VR (virtual reality) is known. Such electronic content uses a three-dimensional virtual space as a display target and displays an image based on the gaze direction of the user wearing a head-mounted display. The use of the head-mounted display results in enhancing the sense of immersion in video and improving the operability of a game or other applications. Further, a walk-through system has been developed to enable the user wearing the head-mounted display to virtually walk around in a space displayed as video, when the user physically moves.

SUMMARY

Technical Problems

In a case where the field of view changes or a displayed world moves, regardless of the type of a display device or the degree of freedom of viewpoint, high responsiveness is required for image display. Meanwhile, in order to achieve realistic image representation, it is necessary to increase the resolution and perform complicated calculations. This leads to an increased load on image processing. Consequently, displayed content may fail to catch up with the movement of the field of view and the movement of the displayed world. This may impair realistic sensations and cause visually-induced motion sickness.

The present invention has been made in view of the above circumstances. An object of the present invention is to provide a technology that is able to maintain a proper balance between image display responsiveness and quality.

Solution to Problems

An aspect of the present invention relates to an image generation device. For viewing through an eyepiece, the image generation device generates a distorted image by subjecting a display target image to a change opposite to a change caused by the aberration of the eyepiece. The image generation device includes a pixel value computation section and a sampling section. The pixel value computation section obtains pixel values of computation target pixels that are preset in an image plane that has not yet been subjected to the opposite change. The sampling section determines the pixel values of the distorted image by interpolating the obtained pixel values and sampling each primary color at different positions in reference to the chromatic aberration of the eyepiece.

Another aspect of the present invention relates to an image generation method used for viewing through an eyepiece by an image generation device that generates a distorted image by subjecting a display target image to a change opposite to a change caused by the aberration of the eyepiece. The image generation method includes a step of obtaining pixel values of computation target pixels that are preset in an image plane that has not yet been subjected to the opposite change, and a step of determining the pixel values of the distorted image by interpolating the obtained pixel values and sampling each primary color at different positions in reference to the chromatic aberration of the eyepiece.

Note that any combination of the above-mentioned components and an expression of the present invention that are converted between, for example, methods, devices, systems, computer programs, data structures, and recording media are also effective as an aspect of the present invention.

Advantageous Effect of Invention

The present invention provides a proper balance between image display responsiveness and quality.

DESCRIPTION OF EMBODIMENT

Figure 1:
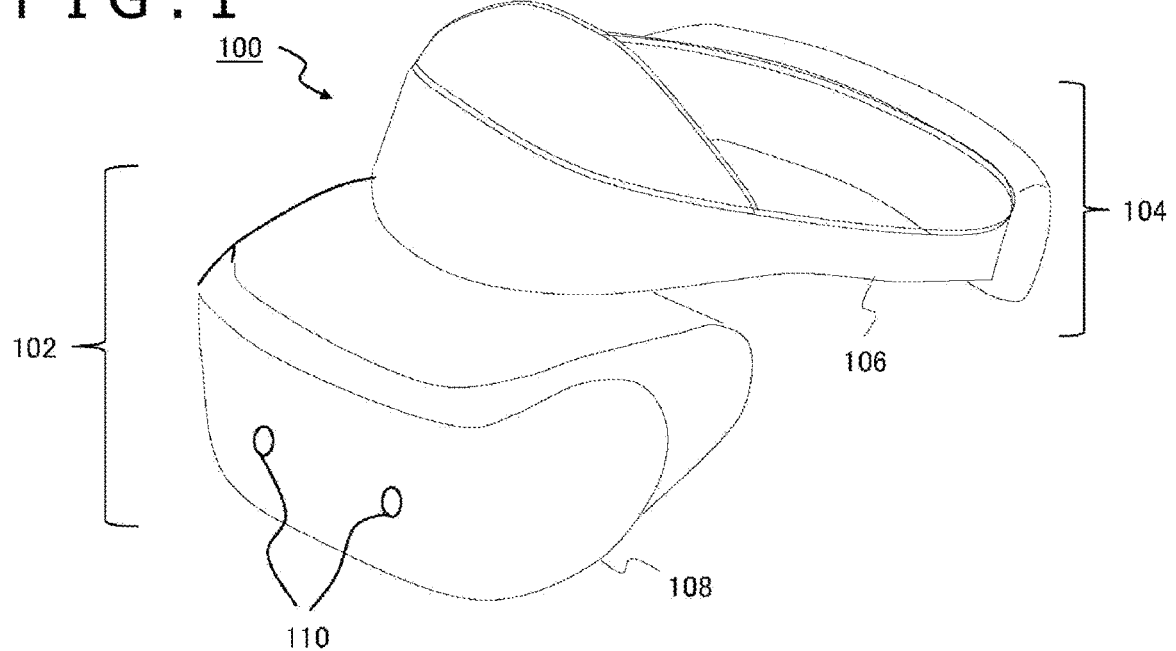
FIG. 1 is a diagram illustrating an example appearance of a head-mounted display in an embodiment of the present invention.

In the present embodiment, it is assumed that a user views an image displayed on a display panel through an eyepiece. In this respect, the type of image display device is not particularly limited to any type. However, the following description assumes that a head-mounted display is used as the image display device. FIG. 1 illustrates an example appearance of a head-mounted display 100. In the example depicted in FIG. 1, the head-mounted display 100 includes an output mechanism section 102 and a mounting mechanism section 104. The mounting mechanism section 104 includes a mounting band 106 that fastens the head-mounted display 100 to the whole circumference of a user's head when the user wears the head-mounted display 100.

The output mechanism section 102 includes a housing 108 and a display panel. The housing 108 is shaped to cover the left and right eyes of the user when the user wears the head-mounted display 100. The display panel is disposed inside the housing 108 and closely faces the eyes of the user when the user wears the head-mounted display 100. The housing 108 further includes the eyepiece that is positioned between the display panel and the user's eyes when the user wears the head-mounted display 100 and that is configured to increase the viewing angle of the user. Moreover, the head-mounted display 100 may additionally include speakers and earphones that are positioned to match the ears of the user when the user wears the head-mounted display 100. Furthermore, the head-mounted display 100 includes a built-in motion sensor to detect the translational motion and rotational motion of the head of the user wearing the head-mounted display 100 and thereby detect the position and posture of the user's head at various points of time.

In the example depicted in FIG. 1, the head-mounted display 100 includes a stereo camera 110. The stereo camera 110, which is mounted on the front surface of the housing 108, shoots a video of the surrounding real space in the field of view corresponding to the gaze of the user. When the shot video is immediately displayed, what is generally called video see-through is achieved, so that the user is able to view the real space in the direction in which the user faces. Further, AR (augmented reality) is achieved when a virtual object is drawn on the image of a real object depicted in the shot video.

Figure 2:
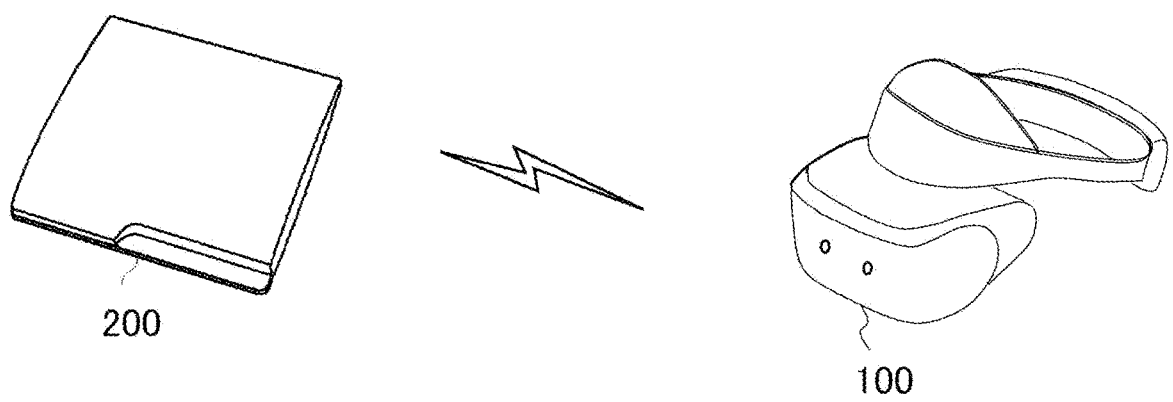
FIG. 2 is a diagram illustrating an example configuration of an image processing system according to the present embodiment.

FIG. 2 illustrates an example configuration of an image processing system in the present embodiment. The head-mounted display 100 is connected to an image generation device 200 through wireless communication or through a USB (Universal Serial Bus) or other interfaces for connecting to a peripheral. The image generation device 200 may further be connected to a server through a network. In a case where the image generation device 200 is connected to the server through the network, the image generation device 200 may be provided with a game or other online applications in which a plurality of users are able to participate through the network.

The image generation device 200 identifies the position of a user's viewpoint and the direction of a user's gaze in reference to the position and posture of the head of the user wearing the head-mounted display 100, generates a display image to provide an appropriate field of view, and outputs the generated display image to the head-mounted display 100. In this respect, image display may be performed for a variety of purposes. For example, the image generation device 200 may generate, as the display image, a virtual world serving as a stage for an electronic game while the electronic game progresses, or may display a still or moving image for viewing or information supply purposes no matter whether a virtual world or a real world is depicted in the display image. Displaying a panoramic image in a wide angle of view centered on the user's viewpoint makes the user feel as being immersed in a displayed world.

Note that some or all of the functions of the image generation device 200 may be implemented in the head-mounted display 100. In a case where all of the functions of the image generation device 200 are implemented in the head-mounted display 100, the image processing system depicted in FIG. 2 is implemented by one head-mounted display 100.

Figure 3:
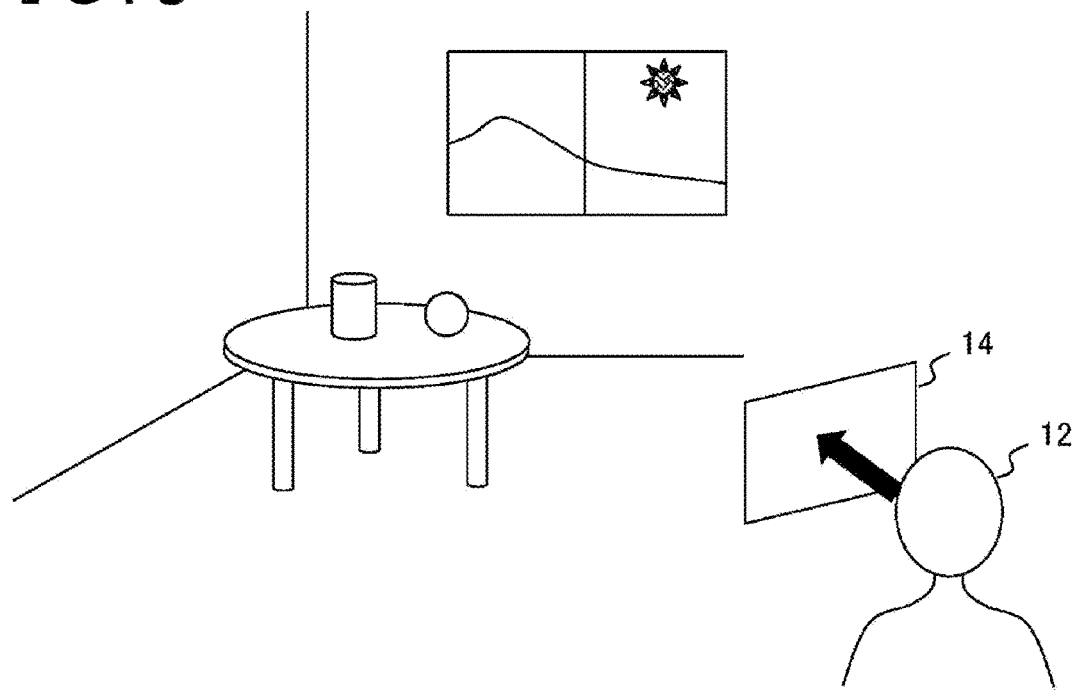
FIG. 3 is a diagram illustrating an example image world that is to be displayed on the head-mounted display by an image generation device according to the present embodiment.

FIG. 3 is a diagram illustrating an example image world that is to be displayed on the head-mounted display 100 by the image generation device 200 in the present embodiment. The example of FIG. 3 creates a situation where a user 12 is in a room that is a virtual space. As depicted in FIG. 3, objects, such as walls, a floor, a window, a table, and things on the table, are disposed in a world coordinate system that defines the virtual space. For the world coordinate system, the image generation device 200 defines a view screen 14 according to the position of the viewpoint of the user 12 and the direction of the gaze of the user 12, and draws the display image by displaying the images of the objects on the view screen 14.

When the position of the viewpoint of the user 12 and the direction of the gaze of the user 12 (hereinafter these may collectively be referred to as the "viewpoint") are acquired at a predetermined rate and the position and orientation of the view screen 14 are changed accordingly, image display can be performed in the field of view corresponding to the viewpoint of the user. When stereo images with parallax are generated and respectively displayed in the left and right regions of the display panel, the virtual space can be stereoscopically viewed. This enables the user 12 to experience a virtual reality that makes the user 12 feel as being in the room in the displayed world.

Figure 4:
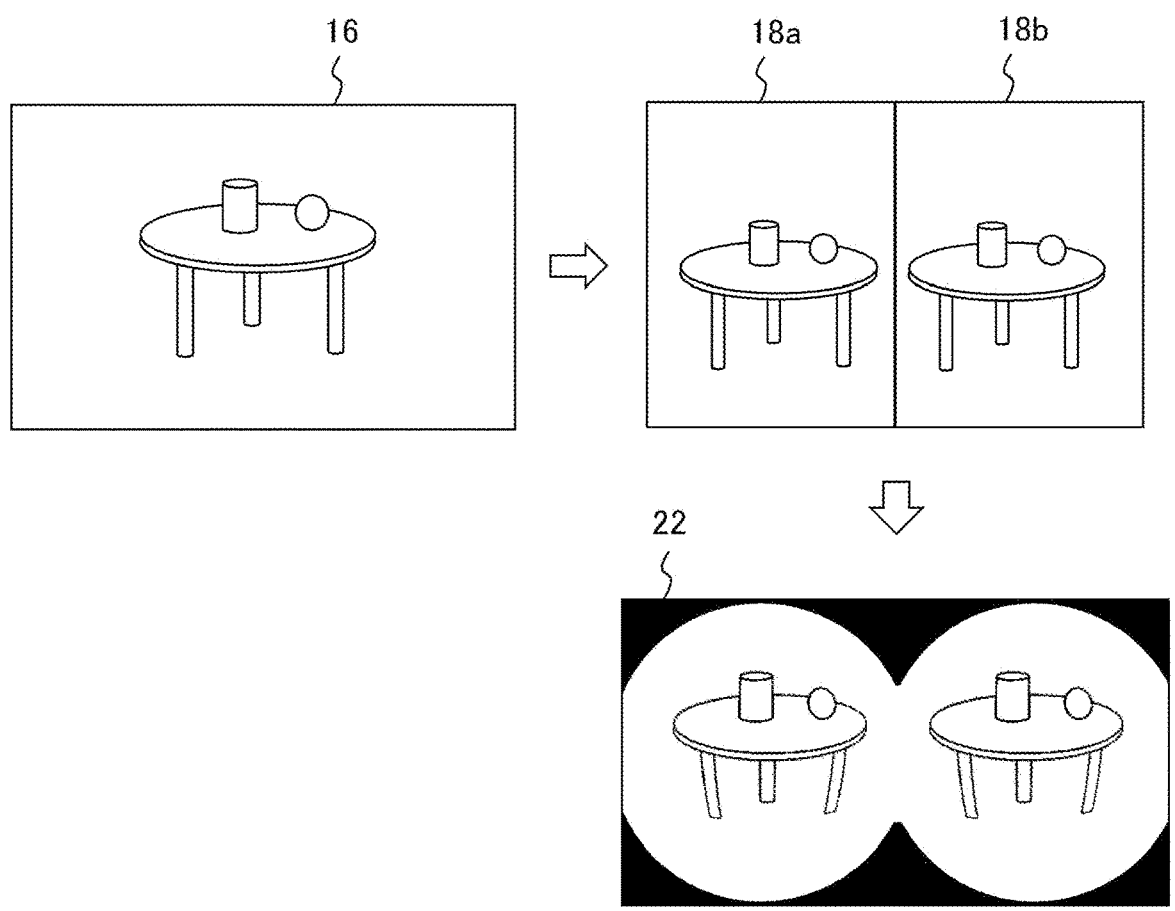
FIG. 4 is a diagram illustrating general processing steps for generating an image to be displayed on the head-mounted display in the embodiment depicted in FIG. 3.

FIG. 4 is a diagram illustrating general processing steps for generating an image to be displayed on the head-mounted display 100 in the embodiment depicted in FIG. 3. First of all, an image 16 corresponding to the user's field of view is generated by projecting objects existing in the virtual world on the view screen corresponding to the user's viewpoint.

When stereoscopic viewing is to be provided, stereo images, i.e., a left-eye image 18a and a right-eye image 18b, are generated by horizontally shifting object images within the image 16 by the parallax between the left and right eyes or generated by generating the image 16 for the individual eyes. A final display image 22 is then generated by subjecting the left-eye image 18a and the right-eye image 18b to reverse correction in association with distortion and chromatic aberration caused by the eyepiece.

Here, the reverse correction is a process that is performed to distort an image in advance or shift the pixels of each primary color (RGB) for making the original image 16 visually recognizable by the user viewing through the eyepiece, by subjecting the image to a change opposite to a change caused by lens aberration. For example, in a case where an employed lens makes the four sides of the image look like a collapsed bobbin, the reverse correction process is performed to curve the image like a barrel as depicted in FIG. 4. An image subjected to distortion or color shift corresponding to the eyepiece is hereinafter referred to as the "distorted image."

Figure 5:
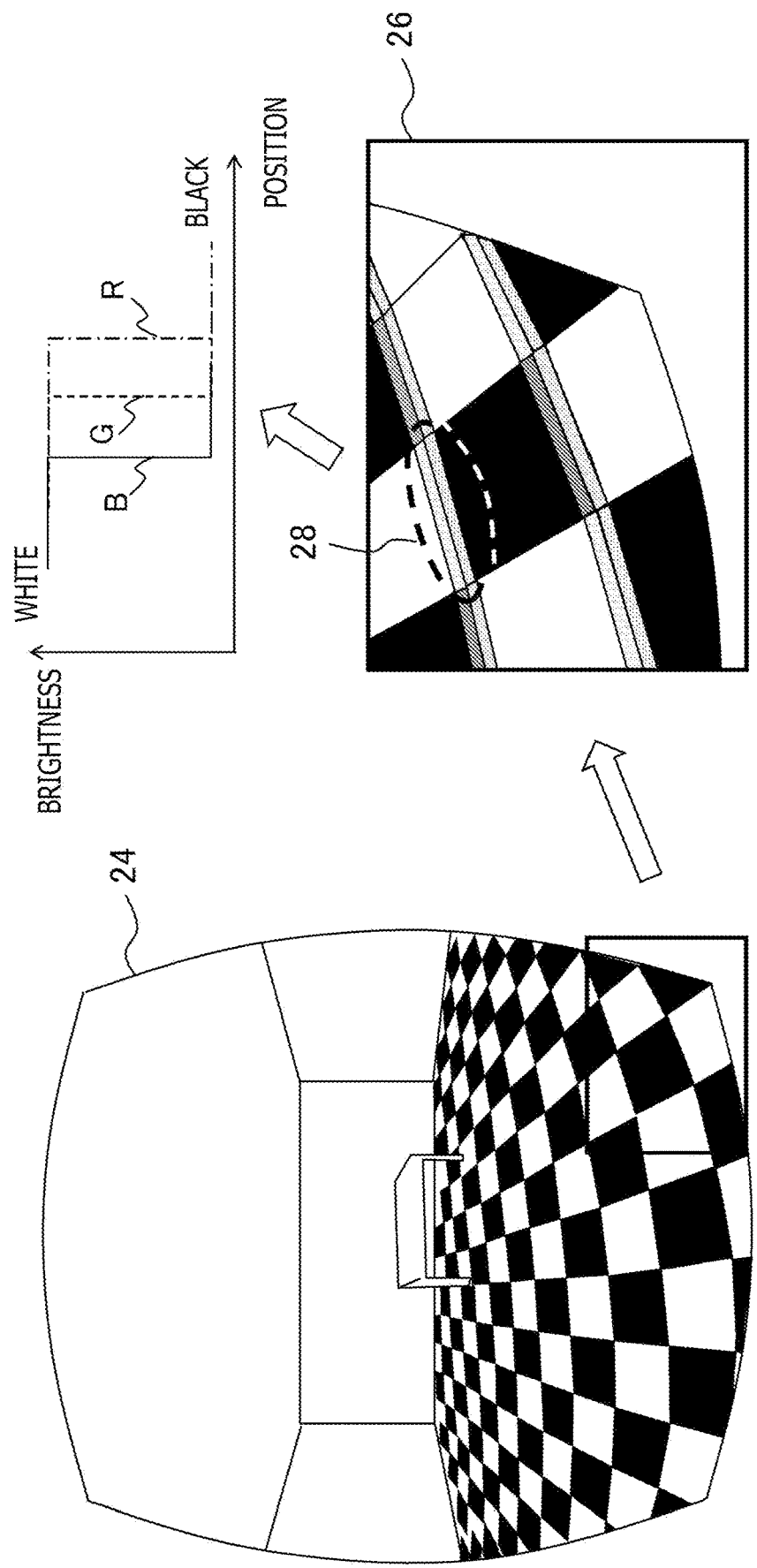
FIG. 5 is a diagram illustrating a color shift in a distorted image in the present embodiment.

FIG. 5 is a diagram illustrating the color shift in the distorted image. In the example of FIG. 5, a distorted image 24 depicts the inside of a room with a black and white checkered pattern. As depicted in FIG. 5, the distorted image 24 is distorted in such a manner that the degree of distortion increases with a decrease in the distance from the periphery, due to the properties of the eyepiece. By the chromatic aberration of the eyepiece, the way of distortion application varies depending on whether the primary color is R (red), G (green), or B (blue). As a result, the degree of color shift in the distorted image 24 increases with a decrease in the distance from the periphery. As depicted, for example, in an image 26 obtained by enlarging the lower right region of the distorted image 24, a gradual color change occurs in a place 28 where the boundary between black and white is originally depicted.

More specifically, as depicted in the upper part of FIG. 5, the boundary where the color changes from white to black varies depending on whether the primary color is R, G, or B. Hence, for example, red remains at maximum brightness in a portion that should originally be a black region. As a result, a color other than white and black appears. When the distorted image 24 that is color-shifted as described above is viewed through the eyepiece, the chromatic aberration corrects a color change to a correct position. Consequently, the resulting visually recognized image is not color-shifted. The distorted image 24 can be generated, for example, by generating an undistorted image and then subjecting the generated undistorted image to varying degrees of distortion based on the aberration with respect to each primary color.

Meanwhile, in recent years, a technology for drawing a high-quality image with low latency with use of a ray tracing technique has been developed. The ray tracing technique is a method of generating virtual rays passing from the viewpoint and propagating through the pixels on the view screen, performing tracking in consideration of interaction, such as reflection, transmission, or refraction, and acquiring color information regarding destinations. When this technology is used to directly draw a color-shifted distorted image, a high-quality image can be displayed with low latency even if the head-mounted display is used as the image display device. In this case, however, the rays vary due to the eyepiece depending on whether the primary color is R, G, or B. Hence, it is necessary to generate the rays for each primary color (RGB) and track the generated rays.

As a result, the load on processing per pixel is three times the load on regular ray tracing. In view of these circumstances, the present embodiment assumes the plane of an undistorted image with no color shift, obtains the pixel values at a representative position in the assumed plane, samples the obtained pixel values of each primary color (RGB), and determines the pixel values of a color-shifted distorted image. As regards an image that is not yet distorted or color-shifted, the number of required rays is one per pixel. Hence, ray tracing can be performed with the same load imposed on processing as in regular ray tracing. It should be noted, however, that source image pixel values may be determined in the present embodiment not only by ray tracing but also by common rasterization.

Further, the undistorted image with no color shift, which is a sampling target, need not actually be a drawn image. That is, when the representative pixel values for sampling use are acquired with respect to a position in the image plane, distorted image pixel values can be determined even if image data indicative of a two-dimensional array of pixel values is not acquired as intermediate data. The sampling target image, that is, an image still not subjected to a change opposite to a change caused by the aberration of the eyepiece, may hereinafter be referred to as the "source image" including the case of the above-mentioned partial data.

Figure 6:
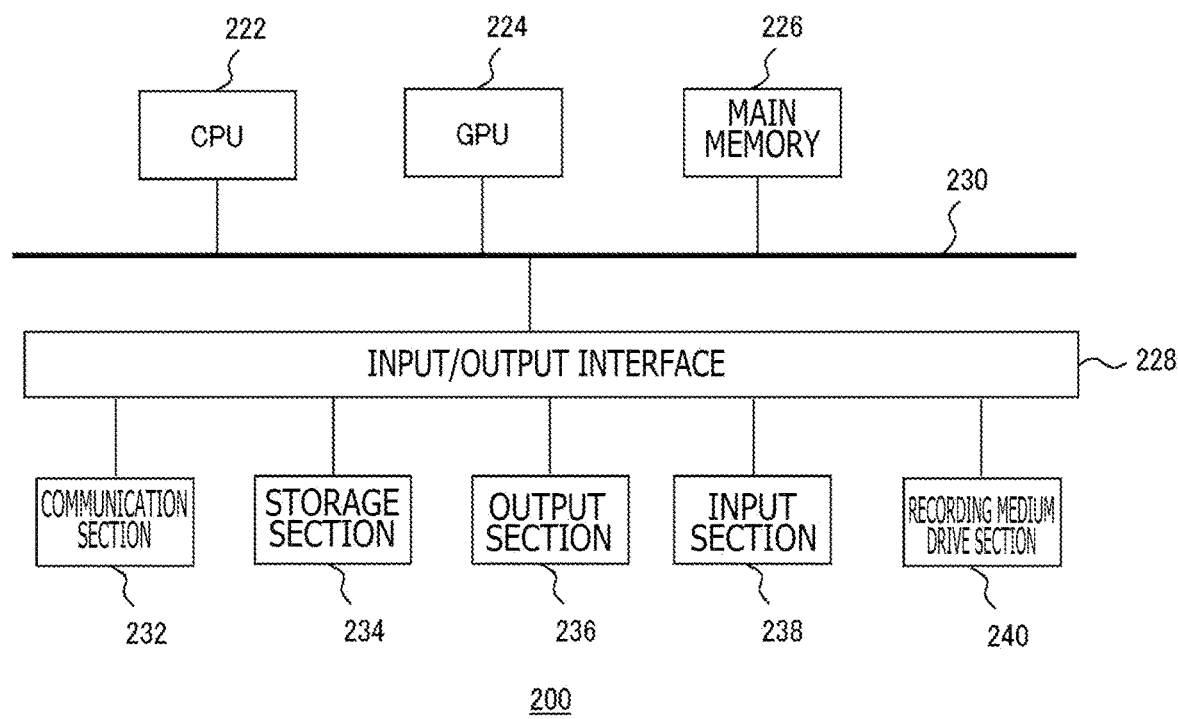
FIG. 6 is a diagram illustrating an internal circuit configuration of the image generation device according to the present embodiment.

FIG. 6 illustrates an internal circuit configuration of the image generation device 200. The image generation device 200 includes a CPU (Central Processing Unit) 222, a GPU (Graphics Processing Unit) 224, and a main memory 226. These components are interconnected through a bus 230. The bus 230 is further connected to an input/output interface 228.

The input/output interface 228 is connected to a communication section 232, a storage section 234, an output section 236, an input section 238, and a recording medium drive section 240. The communication section 232 includes a USB, IEEE (Institute of Electrical and Electronics Engineers) 1394, or other peripheral device interface and a wired or wireless LAN (Local Area Network) network interface. The storage section 234 includes, for example, a hard disk drive or a non-volatile memory. The output section 236 outputs data to the head-mounted display 100. The input section 238 inputs data from the head-mounted display 100. The recording medium drive section 240 drives a removable recording medium such as a magnetic disk, an optical disk, or a semiconductor memory.

The CPU 222 provides overall control of the image generation device 200 by executing an operating system stored in the storage section 234. The CPU 222 also executes various programs that are read from a removable recording medium and loaded into the main memory 226 or downloaded through the communication section 232. The GPU 224 functions as a geometry engine and as a rendering processor, performs a drawing process in accordance with a drawing instruction from the CPU 222, and outputs the result of the drawing process to the output section 236. The main memory 226 includes a RAM (Random Access Memory) to store programs and data necessary for processing.

Figure 7:
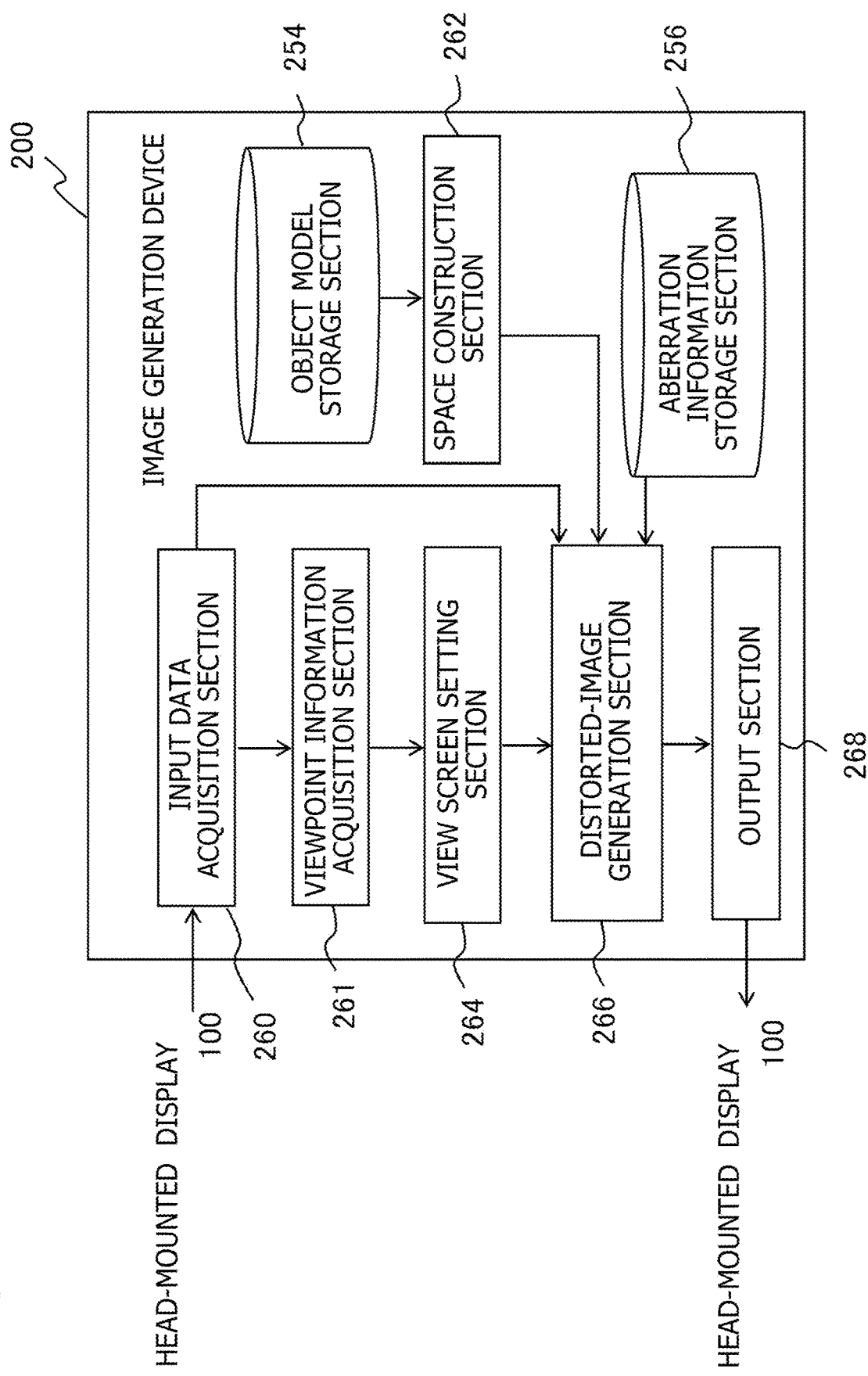
FIG. 7 is a diagram illustrating a functional block configuration of the image generation device according to the present embodiment.

FIG. 7 illustrates a configuration of functional blocks of the image generation device 200 according to the present embodiment. As mentioned above, the image generation device 200 may perform common information processing for allowing an electronic game to progress and communicating with the server. In FIG. 7, however, focus is placed particularly on a function of generating the display image. Note that at least some of the functions of the image generation device 200, which are depicted in FIG. 7, may be implemented in the head-mounted display 100. Alternatively, at least some of the functions of the image generation device 200 may be implemented in the server that is connected to the image generation device 200 through the network.

Further, the functional blocks illustrated in FIG. 7 can be implemented by hardware such as the CPU, GPU, or memories depicted in FIG. 6, and are implemented by software such as programs loaded into the memories, for example, from a recording medium for performing data input, data retention, image processing, communication, and other functions. Hence, it will be understood by persons skilled in the art that the functional blocks may variously be implemented by hardware only, by software only, or by a combination of hardware and software. The method for implementing the functional blocks is not particularly limited to any kind.

The image generation device 200 includes an input data acquisition section 260, a viewpoint information acquisition section 261, a space construction section 262, a view screen setting section 264, a distorted-image generation section 266, and an output section 268. The input data acquisition section 260 acquires data transmitted from the head-mounted display 100. The viewpoint information acquisition section 261 acquires information regarding the user's viewpoint. The space construction section 262 constructs the space of a display target. The view screen setting section 264 sets the view screen corresponding to the viewpoint. The distorted-image generation section 266 generates a distorted image that is obtained by making reverse correction based on the aberration of the eyepiece. The output section 268 outputs the data regarding the distorted image to the head-mounted display 100.

The image generation device 200 further includes an object model storage section 254 and an aberration information storage section 256. The object model storage section 254 stores data regarding an object model required for space construction. The aberration information storage section 256 stores data regarding the aberration of the eyepiece. The input data acquisition section 260 includes, for example, the input section 238 and the CPU 222, which are depicted in FIG. 6, and acquires, at a predetermined rate, data, for example, regarding values measured by the motion sensor and images captured by the stereo camera 110, which are transmitted from the head-mounted display 100.

The viewpoint information acquisition section 261 includes, for example, the CPU 222 depicted in FIG. 6, and acquires the position of the user's viewpoint and the direction of the user's gaze at a predetermined rate. For example, the viewpoint information acquisition section 261 identifies the position and posture of the user's head in reference to the values measured by the motion sensor of the head-mounted display 100. An alternative is to dispose an undepicted luminous marker at a place outside the head-mounted display 100, allow the viewpoint information acquisition section 261 to acquire a captured image of the luminous marker from an undepicted imaging device and analyze the captured image, and thereby acquire information regarding the position and posture of the user's head.

As another alternative, the viewpoint information acquisition section 261 may acquire the position and posture of the user's head by using SLAM (Simultaneous Localization and Mapping) or other techniques according to the image captured by the stereo camera 110. When the position and posture of the user's head are acquired in the above manner, the position of the user's viewpoint and the direction of the user's gaze can approximately be identified. It should be noted that the viewpoint information acquisition section 261 may predict the position of the user's viewpoint and the direction of the user's gaze in reference to a past motion of the user's viewpoint, at a timing when the head-mounted display 100 displays an image.

It will be understood by persons skilled in the art that various other means are available to acquire the information regarding the user's viewpoint or predict the user's viewpoint. For example, an alternative is to dispose a gaze point detector in the housing 108 of the head-mounted display 100 for tracking the gaze point of the user with respect to a display screen, allow the input data acquisition section 260 to acquire the result of the tracking at a predetermined rate, and thereby enable the viewpoint information acquisition section 261 to exactly acquire or predict the user's viewpoint.

The space construction section 262 includes, for example, the CPU 222, the GPU 224, and the main memory 226, which are depicted in FIG. 6, and constructs a shape model for a space where display target objects exist. In the example depicted in FIG. 3, objects, such as walls, a floor, a window, a table, and things on the table, are disposed in the world coordinate system that defines the virtual space. The information regarding the shape of each object is read out from the object model storage section 254. The space constructed by the space construction section 262 may vary with the progress of, for example, a game.

The view screen setting section 264 includes, for example, the CPU 222, the GPU 224, and the main memory 226, which are depicted in FIG. 6, and sets the view screen in correspondence with the user's viewpoint and gaze acquired or predicted by the viewpoint information acquisition section 261. That is, the view screen setting section 264 sets screen coordinates in correspondence with the position of the user's head and the direction in which the user faces. As a result, the space of the display target is drawn on a screen plane in the field of view corresponding to the position of the user and the direction in which the user faces. The view screen set as described above corresponds to the plane of the display panel of the head-mounted display 100, and defines the matrix of pixels of the distorted image.

The distorted-image generation section 266 includes, for example, the GPU 224 and the main memory 226, which are depicted in FIG. 6, and generates a distorted image as the display image at a predetermined rate. The distorted image is obtained by making reverse correction based on the eyepiece of the head-mounted display 100. More specifically, the distorted-image generation section 266 first calculates the pixel values (RGB) in the plane of the undistorted source image as mentioned above, and then performs sampling by obtaining the pixel values at positions corresponding to the pixels of the distorted image by means of interpolation. As mentioned earlier, the degree of distortion varies from one primary color (RGB) to another. Hence, sample positions also vary from one primary color (RGB) to another.

Further, according to the sample positions, the distorted-image generation section 266 selectively determines the positions where the pixel values are to be obtained in the source image plane. This efficiently improves image quality while reducing the load on processing. The pixels targeted for pixel value calculation in the source image plane are hereinafter referred to as the "computation target pixels." The pixel values of the computation target pixels may be determined by ray tracing as mentioned earlier. In such an instance, the eyepiece need not be taken into consideration.

When ray tracing is adopted, processing can be performed independently for each pixel. Note that ray tracing is a widely known technique. Although various models, such as ray marching, path tracing, and photon mapping, are proposed, any of them may be adopted. A method of generating rays and acquiring color information in consideration of interaction in a three-dimensional space is hereinafter referred to as "ray tracing" regardless of the adopted model.

As mentioned above, the positions of the computation target pixels in the source image plane are determined in reference to the sample positions for each of the RGB pixels in the distorted image. The relation between the sample positions and the RGB pixels in the distorted image is dependent on the aberration of the eyepiece mounted in the head-mounted display 100. Hence, information regarding the aberration of the eyepiece, such as data regarding distortion distribution of each primary color, is stored beforehand in the aberration information storage section 256.

In reference to the above-mentioned information regarding the aberration of the eyepiece, the distorted-image generation section 266 obtains the sample positions in the source image plane, and determines beforehand the positions of the computation target pixels in correspondence with the obtained sample positions. Consequently, at the time of display image generation, computation, such as ray tracing, is performed on the pixels at the same positions. However, as described later, the distorted-image generation section 266 may change the computation target pixels according to, for example, image content and the region of interest of the user.

When the display image is to be stereoscopically viewed, the distorted-image generation section 266 generates the display image for each of the left and right eyes. More specifically, the distorted-image generation section 266 generates a distorted image for a left-eye lens of the eyepiece with the left eye regarded as the viewpoint, and generates a distorted image for a right-eye lens of the eyepiece with the right eye regarded as the viewpoint. The output section 268 includes, for example, the CPU 222, the main memory 226, and the output section 236, which are depicted in FIG. 6, and sequentially transmits the data regarding the distorted image, which is generated by the distorted-image generation section 266, to the head-mounted display 100. When stereoscopic viewing is to be provided, the data to be outputted is configured such that the distorted image for the left eye is disposed in the left half of the display image while the distorted image for the right eye is disposed in the right half of the display image.

Figure 8:
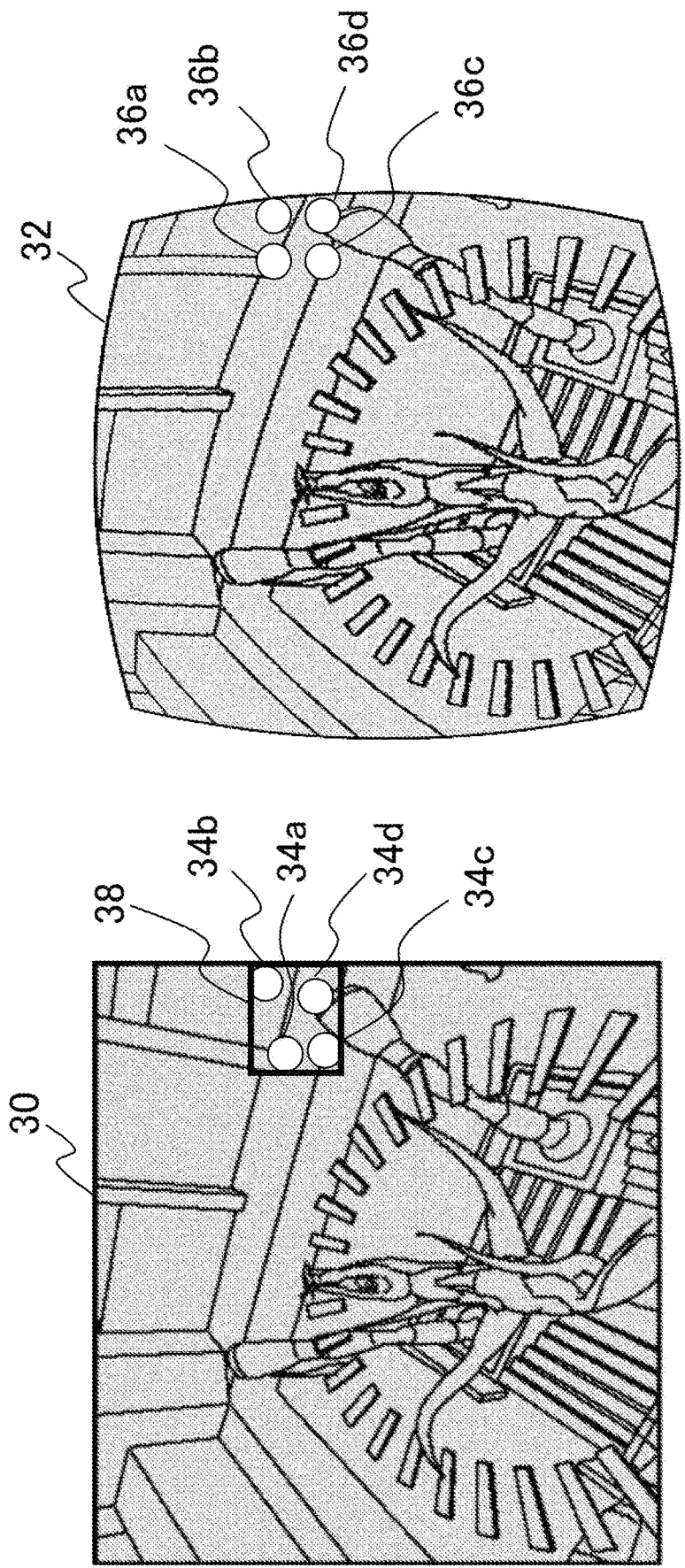
FIG. 8 is a diagram illustrating the relation between a source image and a distorted image in the present embodiment.

FIG. 8 illustrates the relation between the source image and the distorted image. Note that, in FIG. 8, the source image 30 is depicted for explanation purposes, and need not always be generated as an image as mentioned above. The same holds true for FIG. 9. If chromatic aberration is not taken into consideration, pixels 36a, 36b, 36c, and 36d in a Cartesian coordinate system in the distorted image 32, which is a final display target, respectively correspond to positions 34a, 34b, 34d, and 34c in the source image 30. That is, the positions 34a, 34b, 34d, and 34c in the source image 30 become the sample positions for generating the distorted image 32.

As depicted in FIG. 8, the sample positions in the source image 30 are arranged in a distorted manner with respect to Cartesian coordinates. As such, the distorted-image generation section 266 sets, for example, a bounding rectangle 38 of the sample positions, and sets the computation target pixels at predetermined positions of the bounding rectangle 38 such as the four corners or sides of the bounding rectangle. In this instance, the sample positions are identified in advance due to the properties of the eyepiece. Consequently, the computation target pixels can also be determined in advance.

That is, the relation between the distorted image 32 and the source image 30 is equal to the relation between a captured image distorted by a typical camera lens and an image obtained by distortion correction. Hence, position shifts (Δx,Δy) of position coordinates (x+Δx,y+Δy) of the source image 30, which correspond to position coordinates (x,y) in the distorted image 32, can be calculated from the following general equations.

[Math. 1]

$$\Delta x = (k_1 r^2 + k_2 r^4 + k_3 r^6 + \dots)(x-c_x)$$

$$\Delta y = (k_1 r^2 + k_2 r^4 + k_3 r^6 + \dots)(y-c_y)$$

(Equations 1)

In the above equations, r is the distance between a lens optical axis and the target pixels, and (Cx,Cy) is the position of the lens optical axis. Further, $k_1$, $k_2$, $k_3$, ... are lens distortion coefficients and dependent on lens design and light wavelength band. The order of correction is not particularly limited to any order. Note that the above equations are typical mathematical expressions for correcting the distortion caused by the eyepiece. However, the method of determining the sample positions in the present embodiment is not limited to the above-described one.

The distorted-image generation section 266 regards each 2×2 pixel block, which includes, for example, the pixels 36a, 36b, 36c, and 36d, as one unit, derives the sample positions in the source image 30 with respect to each such unit by using, for example, Equations 1, determines the computation target pixels corresponding to the derived sample positions, and establishes the correspondence. Further, at the time of image display, the distorted-image generation section 266 determines the pixel values of the computation target pixels by ray tracing, interpolates the determined pixel values to determine the pixel values of the sample positions, and thereby determines the pixel values of the pixel blocks in the distorted image 32.

Figure 9:
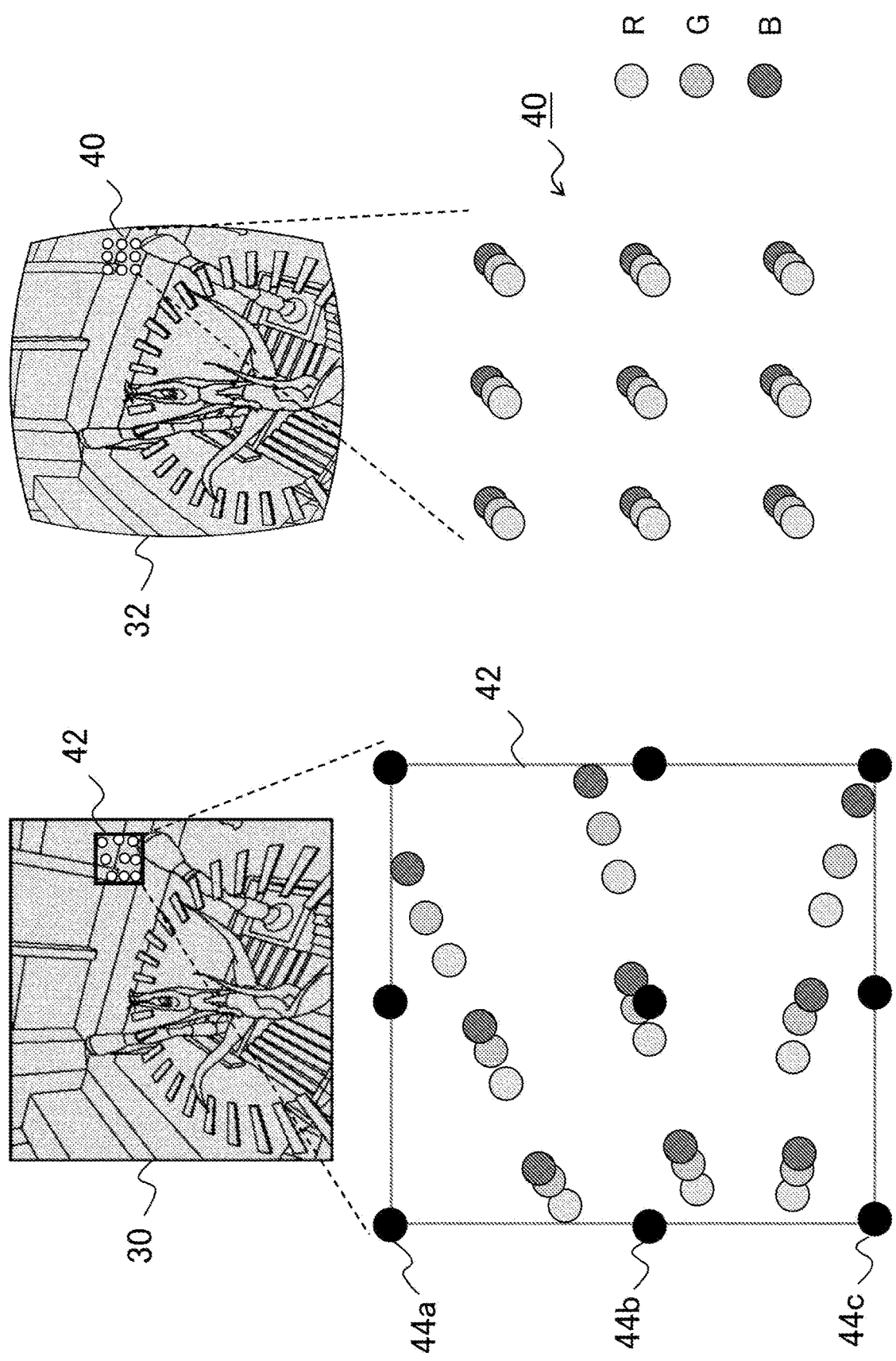
FIG. 9 is a diagram illustrating the relation between sample positions and computation target pixels in a situation where chromatic aberration is taken into consideration in the present embodiment.

FIG. 9 illustrates the relation between the sample positions and the computation target pixels in a situation where chromatic aberration is taken into consideration. As is the case with FIG. 8, the sample positions in the source image 30 are acquired in a distorted arrangement with respect to a pixel block 40 including a plurality of pixels in the Cartesian coordinate system of the distorted image 32, and then a bounding rectangle 42 is set for the acquired sample positions. However, in the example of FIG. 9, it is assumed that 3×3 pixels in the distorted image form one block (one unit). The lower right part of FIG. 9 presents an enlarged view of one pixel block 40. As indicated by the legend at the right end of FIG. 9, the RGB components of each pixel are depicted by circles shaded in different patterns.

In the enlarged view of the pixel block 40, for the sake of convenience, the marks for the pixel's RGB components at the same position are slightly displaced from each other. The distorted-image generation section 266 determines the RGB values of each pixel for each pixel block of the distorted image 32. However, as depicted by an enlarged view presented in the lower left part of FIG. 9, RGB sample positions in the source image 30 are unevenly distributed due to the chromatic aberration of the eyepiece, and hence, due to the difference between the lens distortion coefficients k in Equations 1. In view of these circumstances, the distorted-image generation section 266 sets, for example, the bounding rectangle 42 containing all the RGB sample positions, and determines the computation target pixels in a predetermined arrangement with respect to the bounding rectangle 42.

In the example illustrated in FIG. 9, a total of 3×3 computation target pixels (e.g., computation target pixels 44a, 44b, and 44c) are set evenly for the bounding rectangle 42 and its internal region. The distorted-image generation section 266 acquires the RGB values of the computation target pixels by using one ray, performs interpolation to obtain the RGB values at their respective sample positions, and regards the obtained RGB values as the pixel values of the distorted image 32. Note that, as long as the values of the sample positions are obtained by interpolation, the arrangement of the computation target pixels and the number of computation target pixels to be set are not limited to any kind or number. For instance, the bounding rectangle is not limited to a square. For example, an oblong rectangle, a parallelogram, or a trapezoid may be used as the bounding rectangle.

Further, as long as a region for distributing the computation target pixels in correspondence with the sample positions of the pixel blocks can be defined, the boundary of the region need not always be a rectangle that precisely bounds the sample positions. The above-mentioned region is hereinafter referred to as the "sampling region." Further, the computation target pixels may be distributed in the sampling region at equal intervals both horizontally and vertically as depicted in FIG. 9 or distributed at intervals different between a horizontal direction and a vertical direction. Alternatively, the computation target pixels in the sampling region may be distributed in different levels of density or arranged in a random manner. In any case, the pixel values at the sample positions can be interpolated by use of a barycentric coordinate system based on an appropriate triangle having vertices located at the positions of the computation target pixels.

Figure 10:
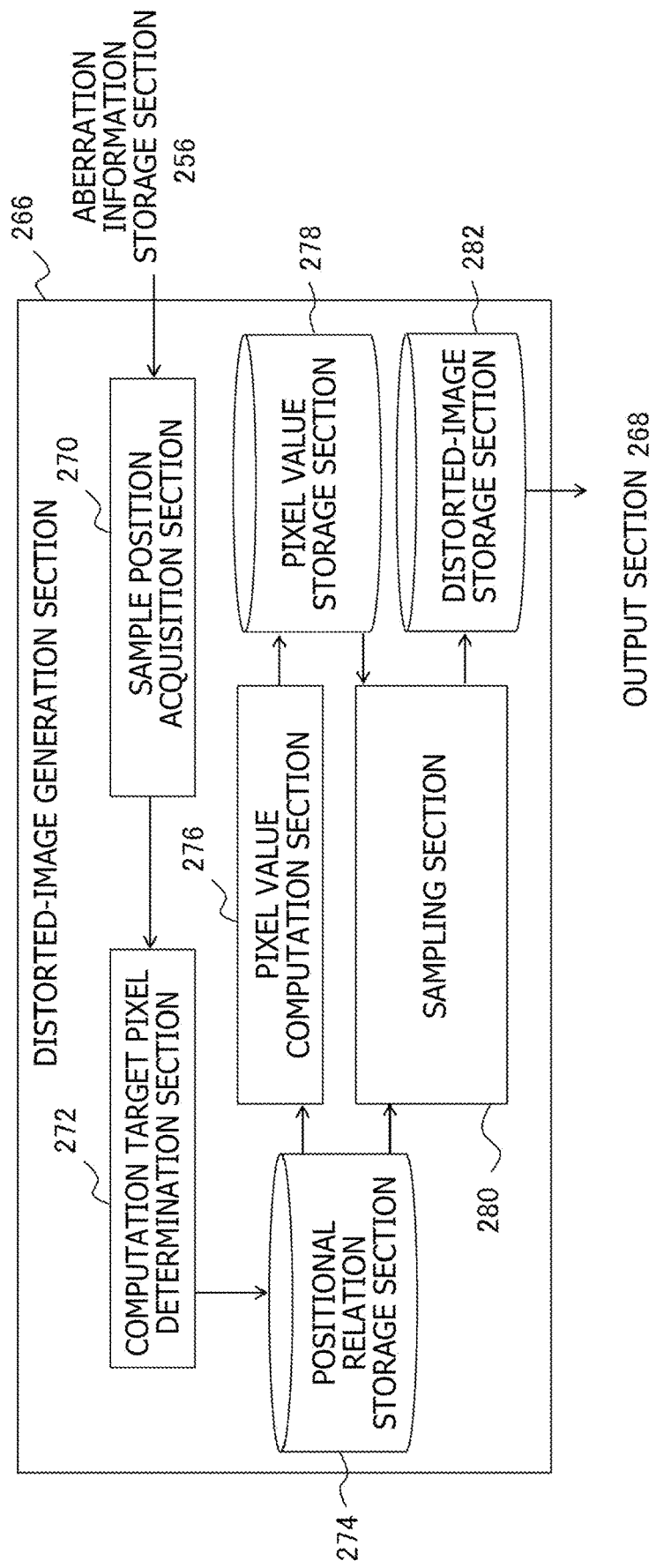
FIG. 10 is a diagram illustrating a detailed functional block configuration of a distorted-image generation section in the present embodiment.

FIG. 10 illustrates a detailed functional block configuration of the distorted-image generation section 266. A sample position acquisition section 270 of the distorted-image generation section 266 reads, from the aberration information storage section 256, the information regarding the aberration of the eyepiece that is mounted in the connected head-mounted display 100, and acquires the sample positions in the source image plane. More specifically, the sample position acquisition section 270 acquires the position coordinates in the source image plane, which correspond to the pixels included in each of the pixel blocks that are obtained by dividing a distorted-image plane into blocks of a predetermined size.

As depicted in FIG. 9, the sample positions vary from one primary color (RGB) to another. Hence, the sample position acquisition section 270 acquires three sample positions per pixel. A computation target pixel determination section 272 determines the sampling region with respect to the sample positions in accordance with predetermined rules, and determines the positions of the computation target pixels with respect to the determined sampling region in accordance with predetermined rules. The sampling region and the computation target pixels corresponding to the sampling region are generated for each pixel block in the distorted-image plane.

A positional relation storage section 274 stores the sampling region, the positions of the computation target pixels, and the RGB sample positions in correspondence with each other, for each pixel block of the distorted image. A pixel value computation section 276 acquires the position coordinates of the computation target pixels from the positional relation storage section 274 at a stage where an image to be actually displayed is generated, and calculates the pixel values of the individual computation target pixels, for example, by ray tracing. A pixel value storage section 278 temporarily stores the values of the computation target pixels included in at least one sampling region.

In reference to the coordinates of the sample positions stored in the positional relation storage section 274, a sampling section 280 acquires the individual RGB values of the sample positions by interpolating the RGB values of the computation target pixels included in the corresponding sampling region. The sampling section 280 stores the RGB values determined by sampling in a distorted-image storage section 282 in correspondence with the pixels of the distorted image. The data regarding the stored distorted image is outputted, for example, in units of rows constituting the pixel block, from the output section 268 to the head-mounted display 100.

Note that, in the depicted example, it is assumed that the pixel value computation section 276 performs, for example, ray tracing on the spot to obtain the pixel values of the computation target pixels in the source image plane. More specifically, the pixel value computation section 276 performs actual sampling of the objects in a display target space to calculate the RGB values represented by the computation target pixels. As long as the pixel values of the computation target pixels included in at least one sampling region are stored in the pixel value storage section 278, the sampling section 280 is able to determine the pixel values of a corresponding pixel block in the distorted image.

Meanwhile, in a case where the whole source image is to be generated separately, the functions of the pixel value computation section 276 may be omitted. In such a case, when the data regarding the whole source image that is generated separately is stored in the pixel value storage section 278, the sampling section 280 is able to similarly perform sampling and determine the pixel values of the distorted image. More specifically, the sampling section 280 references the positional relation storage section 274, extracts pixels corresponding to the computation target pixels from the source image representing all the pixels, and interpolates the extracted pixels to perform sampling for each of the RGB colors.

The above-described aspect is implemented when, for instance, a conventional rendering device is additionally used to generate the source image, for example, by rasterization, and then the generated source image is stored in the pixel value storage section 278. Alternatively, the pixel value computation section 276 may have such a function. In such a case, the pixel value computation section 276 may determine the pixel values of the whole two-dimensional array of pixels or determine only the pixel values of the computation target pixels corresponding to all associated pixel blocks.

Figure 11:
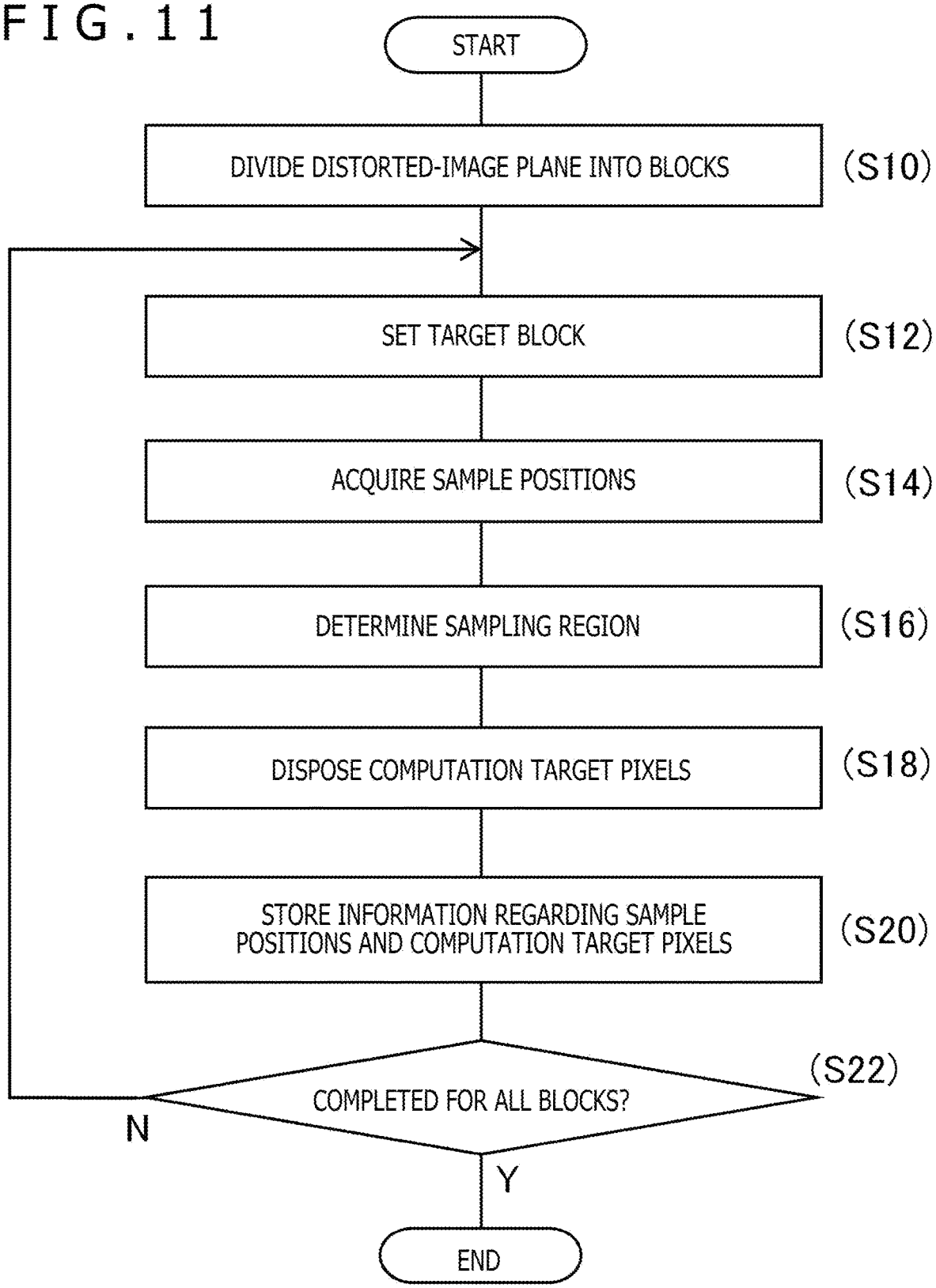
FIG. 11 is a flowchart illustrating processing steps that are performed in the present embodiment by a sample position acquisition section and a computation target pixel determination section in order to determine the correspondence between distorted-image pixel blocks and computation target pixels.

FIG. 11 is a flowchart illustrating processing steps that are performed by the sample position acquisition section 270 and the computation target pixel determination section 272 in order to determine the correspondence between the computation target pixels and distorted-image pixel blocks. First of all, the sample position acquisition section 270 forms the pixel blocks by dividing the distorted-image plane into blocks having a predetermined number of pixels (S10). It is possible that the size of the pixel blocks is, for example, 3×3 pixels, 4×4 pixels, or 16×16 pixels. However, the pixel block size is not limited to those mentioned above.

Next, the sample position acquisition section 270 sets one of the pixel blocks as a target block (S12), and then acquires, as the sample positions, the positions in the source image plane that correspond to the pixels included in the target block (S14). This processing is performed on each of the RGB colors according to the aberration of the eyepiece. Subsequently, the computation target pixel determination section 272 determines the sampling region in correspondence with the plurality of sample positions set for the source image plane (S16).

For example, assume that the sampling region contains all the sample positions for each of the RGB colors and is the inside of a rectangle bounding the outermost sample position. Then, the computation target pixel determination section 272 disposes the computation target pixels with respect to the sampling region in accordance with predetermined rules (S18). In a case, for example, where the distorted-image pixel block includes N×N pixels, the same N×N computation target pixels are set at equally spaced positions including the vertices and sides of the sampling region.

Subsequently, the computation target pixel determination section 272 causes the positional relation storage section 274 to store information including the sample positions in the source image plane and the positions of the computation target pixels in correspondence with the target pixel block (S20). When the information regarding all the pixel blocks is stored by repeatedly performing the processing in S14 to S20 for all the pixel blocks forming the distorted image ("N" in S22, S12), the processing terminates ("Y" in S22).

Figure 12:
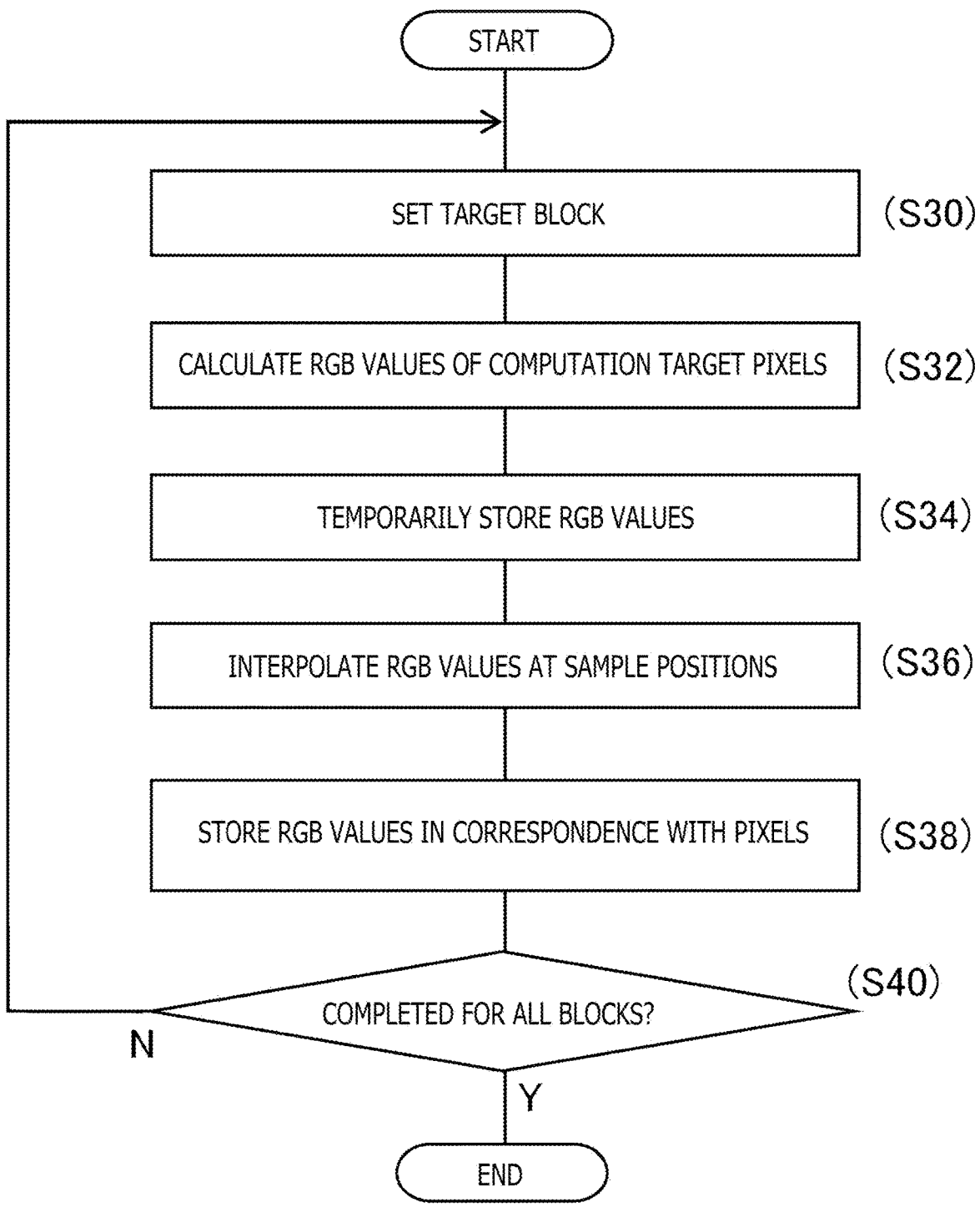
FIG. 12 is a flowchart illustrating processing steps that are performed in the present embodiment by a pixel value computation section and a sampling section in order to determine the distorted-image pixel values.

FIG. 12 is a flowchart illustrating processing steps that are performed by the pixel value computation section 276 and the sampling section 280 in order to determine the distorted-image pixel values. First, the pixel value computation section 276 sets one pixel block whose pixel values are to be determined (S30). For example, the pixel value computation section 276 starts from selecting the upper left pixel block of the distorted image. Next, the pixel value computation section 276 references the positional relation storage section 274, and calculates the RGB pixel values of the computation target pixels that correspond to a target pixel block (S32). For example, the pixel value computation section 276 generates rays for each computation target pixel, and performs ray tracing to acquire a set of pixel values.

The pixel value computation section 276 temporarily stores the calculated RGB values in the pixel value storage section 278 in correspondence with the positions of pixels (S34). The values of the computation target pixels in one sampling region are used to determine the pixel values of one corresponding pixel block. Hence, the data is stored until at least the relevant processing is completed. Next, the sampling section 280 interpolates the RGB values of the computation target pixels to acquire the individual RGB values at their sample positions (S36). The sampling section 280 stores the acquired R, G, and B values in the distorted-image storage section 282 in correspondence with the position coordinates of the pixels of the original distorted image (S38).

When the pixel values of all the blocks are determined by repeatedly performing the processing in S32 to S38 for all the pixel blocks forming the distorted image ("N" in S40, S30), the processing terminates ("Y" in S40). In the meantime, the sampling section 280 outputs the data regarding the distorted image that is stored in the distorted-image storage section 282 to the output section 268 at a predetermined timing. When the processing depicted in FIG. 12 is repeatedly performed for each frame, the head-mounted display displays a moving image that represents the distorted image formed in consideration of chromatic aberration.

When the above-described configuration is adopted, high efficiency is achieved by allowing the GPU to implement the pixel value computation section 276 and the sampling section 280 and performing parallel computations on the pixels included in one pixel block. For example, in a case where SIMD (Single Instruction Multiple Data) is implemented in the GPU, the pixel block is formed by pixels the number of which is the same as the number obtained by multiplying the parallel number (SIMD unit) by a natural number, and the same number of corresponding computation target pixels are set. When, for instance, a GPU manufactured by NVIDIA Corporation is used and the SIMD unit corresponding to 1 Warp is 32 threads, one block is formed, for example, by 4×8, 8×16, or 16×16 pixels. Consequently, processing efficiency can be enhanced by performing computation and sampling based on the above-mentioned unit through the use of the ray tracing technique.

In the above case, when the pixel value storage section 278, which temporarily stores the pixel values of the computation target pixels, is implemented by a register or Shared Memory in the GPU, the sampling section 280 is able to perform sampling at a high speed. However, in a case where the computation target pixels the number of which is n times the SIMD unit (n is 2 or a greater natural number) are set, sampling needs to be placed on standby until the values of all the computation target pixels are determined, that is, until n−1 cycles are additionally performed.

Figure 13:
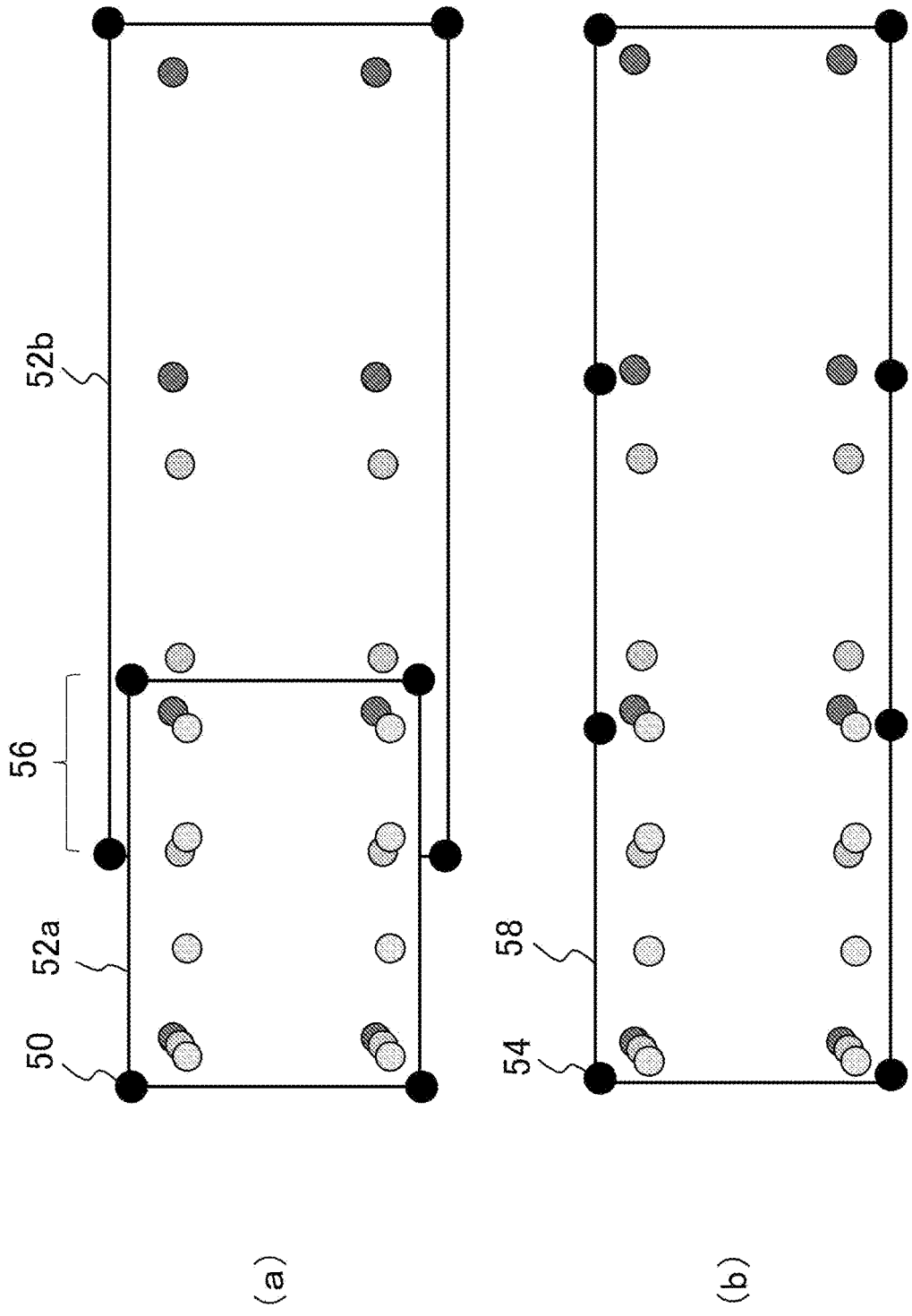
FIG. 13 depicts diagrams illustrating the influence exerted by the number of pixels included in pixel blocks in the present embodiment.

FIG. 13 depicts diagrams illustrating the influence exerted by the number of pixels included in the pixel blocks. Depicted in (a) of FIG. 13 is a case where 2×2 computation target pixels are set for a pixel block of 2×2 pixels. Depicted in (b) of FIG. 13 is a case where 4×2 computation target pixels are set for a pixel block of 4×2 pixels. The diagrams depict a part of the image plane, indicate the individual RGB sample positions by circles shaded in different patterns, and indicate the computation target pixels by black circles (e.g., computation target pixels 50, 54). Further, the SIMD unit is four threads, and computation is performed on one pixel per thread.

In the case of (a), computations on four computation target pixels, which form one set, are simultaneously completed. Therefore, the sampling section 280 is able to start sampling immediately after completion of computations. Meanwhile, in a case where sampling region setup is performed in such a manner as to contain all the RGB sample positions, an overlapping region 56 is generated in a plurality of sampling regions as indicated by a sampling region 52a and a sampling region 52b. The reason is that the range covered by the sample positions in the individual pixel blocks varies from one primary color (RGB) to another.

In the example depicted in FIG. 13, the distribution of B sample positions is approximately two times horizontally wider than the distribution of R sample positions. Hence, when the sampling region 52a is set to contain both the R and B sample positions, the sampling region is extended from the left-end R sample positions to the right-end B sample positions. The B sample positions overlap with the R and G sample positions in the other sampling region 52b. As a result, the overlapping region 56 is generated.

Meanwhile, in the case of (b), computations on eight computation target pixels, which form one set, are not completed by a single parallel process as mentioned above. Hence, a sampling process needs to be placed on standby until two parallel processes are completed. However, in the case of (b), the number of computation target pixels per unit area is larger than that in the case of (a). For example, the computation target pixels in a sampling region 58 in the case of (b) are higher in density than the computation target pixels in the sampling region 52b in the case of (a). The reason is that the spread of the distribution of RGB sampling positions with respect to one pixel block is easily absorbed by the size of the area of the sampling region 58, which results in reducing the overlap between the sampling regions.

Stated differently, since sampling can be performed with use of highly dense pixel values, greater contribution can easily be made to improve image quality than in the case of (a). As described above, the division granularity of pixel blocks in the distorted image and eventually the sizes of the sampling regions affect both image quality and processing standby time (synchronization cost). Qualitatively, when the fineness of pixel blocks increases, the overlap between the sampling regions readily increases to degrade image quality, but the synchronization cost of processing decreases. When the pixel blocks increase in size, the overlap between the sampling regions readily decreases to improve image quality, but the synchronization cost of processing increases.

In view of the above circumstances, it is preferable that the division granularity of pixel blocks be optimized according to, for example, the aberration of the eyepiece mounted in the head-mounted display 100, the characteristics of the content to be displayed, and image quality requirements. For example, the sample position acquisition section 270 may store a table defining the correspondence between the above-mentioned parameters and the optimal number of pixels per pixel block, and optimize the division granularity according to the actual situation.

Figure 14:
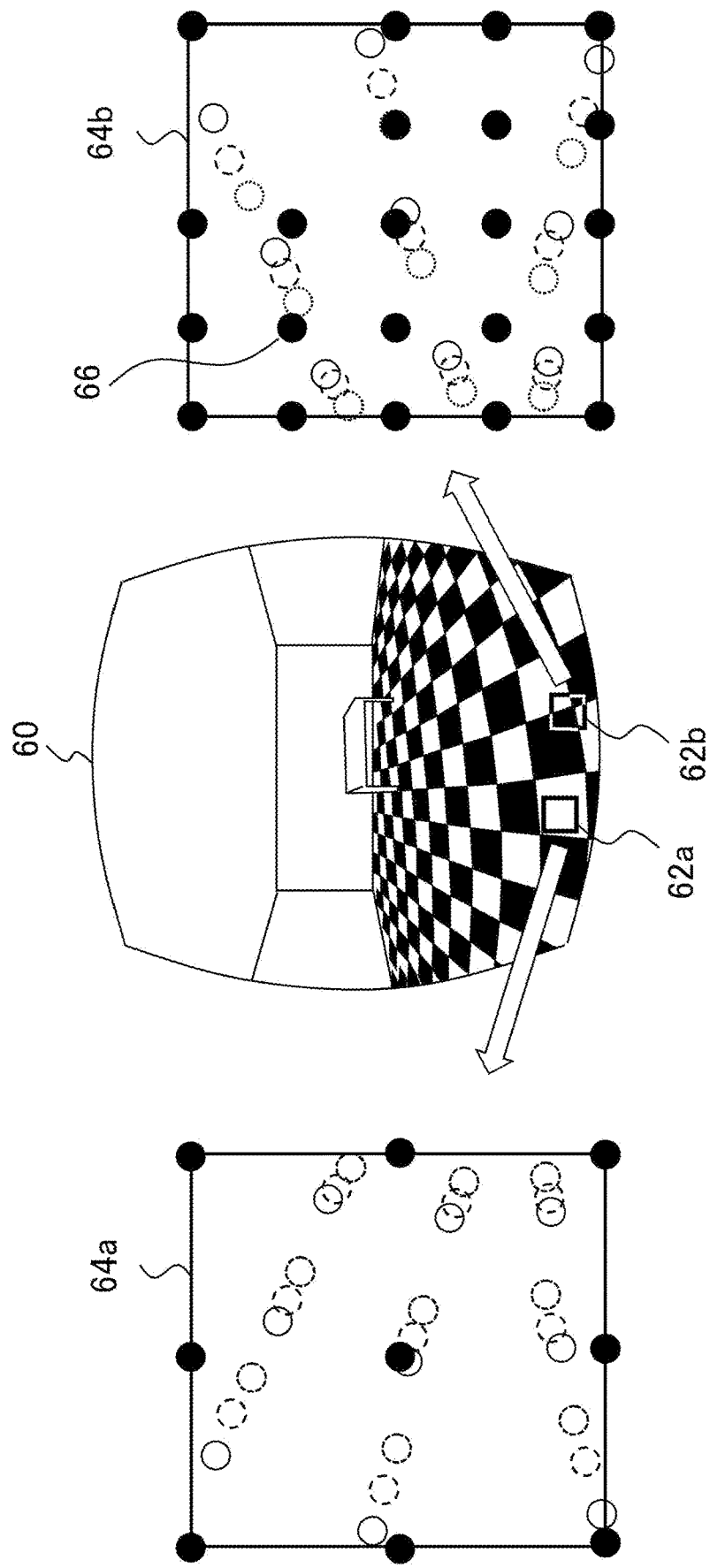
FIG. 14 is a diagram illustrating an aspect where the number of computation target pixels varies in an image plane in the present embodiment.

It is assumed in FIG. 13 that the number of pixels included in one pixel block is the same as the number of the corresponding computation target pixels. However, the present embodiment is not limited to such a configuration. FIG. 14 is a diagram illustrating an aspect where the number of computation target pixels varies in the image plane. In the example of FIG. 14, the number of computation target pixels to be set for one sampling region varies depending on whether or not the edge of an image represented as the image 60 is included. Here, the edge is a place where the spatial change rate of pixel values is qualitatively equal to or higher than a predetermined value, and can be detected by a general edge extraction filter.

In the example depicted in FIG. 14, 3×3 computation target pixels are set as indicated by black circles for a sampling region 64a corresponding to a region 62a that is included in the image 60 and is provided with no edge. Meanwhile, additional computation target pixels (e.g., a computation target pixel 66) are added to some places in a sampling region 64b that corresponds to a region 62b provided with the edge. For example, even in one sampling region 64b, the additional computation target pixels are locally added to places within a predetermined range from the edge of the image.

As described above, the additional computation target pixels may be added to change the density in correspondence with the position of the edge in the sampling region 64b or may be added to provide similar density in the whole of the sampling region 64b where the edge exists. Further, the additional computation target pixels may be added not only to systematic positions but also to random positions. The influence exerted by the chromatic aberration of the eyepiece is readily recognized at the edge portion of the image. Hence, when the number of computation target pixels in the relevant region is increased to perform high-precision sampling, a high-quality image with no color shift can be recognized.

In the above case, the pixel value computation section 276 first acquires the pixel values of the computation target pixels regarding a target sampling region before the addition of additional computation target pixels, and then performs edge extraction by using an edge extraction filter such as a Sobel filter. Subsequently, when it is determined that the edge is included in the relevant sampling region, the pixel value computation section 276 adds additional computation target pixels in accordance with predetermined rules, and obtains the pixel values of the added computation target pixels in a similar manner. The sampling section 280 may perform sampling in a similar manner except for changes of pixels used for interpolation. Note that, according to the size and length of an edge region included in one sampling region, the pixel value computation section 276 may determine, for example, whether or not to add additional computation target pixels and the number of additional computation target pixels to be added.

Figure 15:
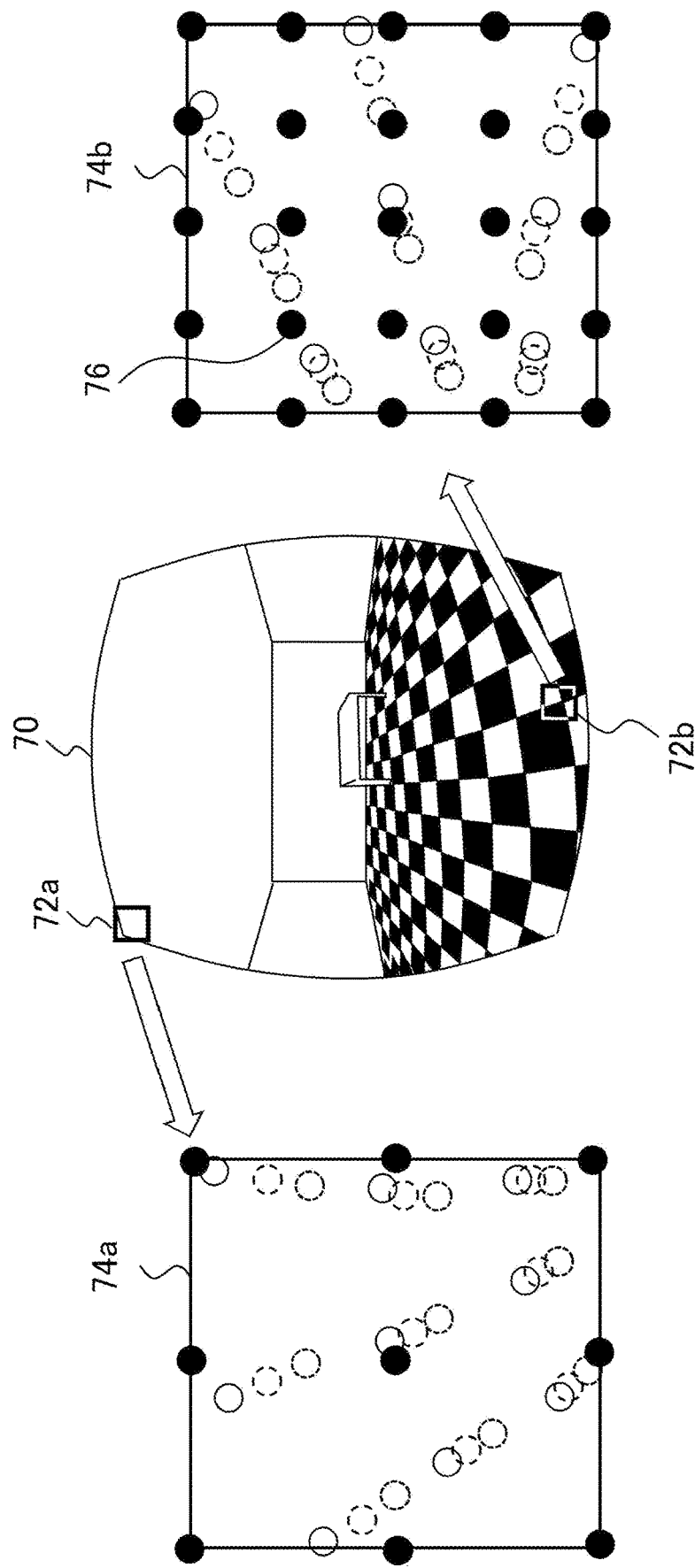
FIG. 15 is a diagram illustrating another aspect where the number of computation target pixels varies in the image plane in the present embodiment.

FIG. 15 is a diagram illustrating another aspect where the number of computation target pixels varies in the image plane. In the example of FIG. 15, the number of computation target pixels to be set for one sampling region varies depending on whether or not the user is paying attention. In the example depicted in FIG. 15, 3×3 computation target pixels are set as indicated by black circles for a sampling region 74a corresponding to a region 72a that is included in an image 70 but not given the attention of the user. Meanwhile, additional computation target pixels (e.g., a computation target pixel 76) are added to a sampling region 74b corresponding to a region 72b that is given the attention of the user. Note that in the above case, too, the arrangement of the computation target pixels is not particularly limited to any kind.

In order to implement the above aspect, the head-mounted display 100 includes a gaze point detector for detecting a region in the display image that is given the attention of the user. The gaze point detector may be, for example, a common one that irradiates the eyeballs of the user with infrared rays, acquires the light reflected from the eyeballs, identifies the direction of the eyeballs, and detects the destination of the user's gaze in reference to the identified direction of the eyeballs. The image generation device 200 acquires the result of detection by the gaze point detector from the head-mounted display 100 at a predetermined rate.

Subsequently, as regards a sampling region corresponding to pixel blocks within a predetermined range from the gaze point, the pixel value computation section 276 adds additional computation target pixels in accordance with predetermined rules, and then determines the pixel values. The above-described configuration avoids a situation where no color shift is recognizable particularly in the region of interest of the user, and improves recognizable image quality without increasing the load on processing. Note that computation target pixel addition based on the edge of the image, which is depicted in FIG. 14, and computation target pixel addition based on the region of interest, which is depicted in FIG. 15, may be combined with each other. Such combination most increases the number of computation target pixels in a region that includes the edge of the image and is given the attention of the user.

Figure 16:
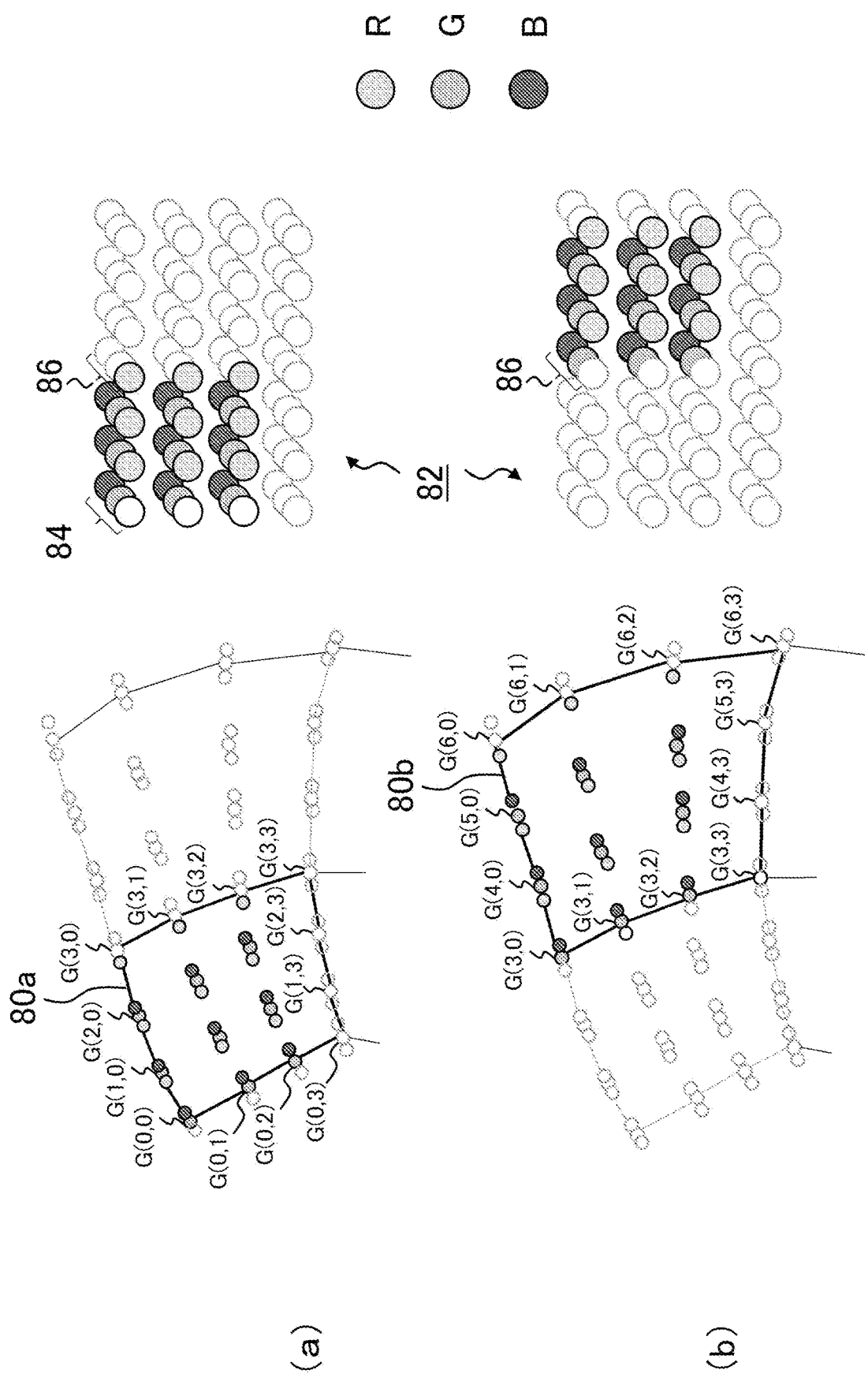
FIG. 16 depicts diagrams illustrating a method of determining a sampling region in reference to G (green) sample positions in the present embodiment.

The aspects described above are basically configured to determine the sampling region in such a manner that one pixel block contains all the RGB sample positions. However, the sampling region may alternatively be determined in reference to only the R, G, or B sample positions. FIG. 16 depicts diagrams illustrating a method of determining the sampling region in reference to the G (green) sample positions. On the left sides of (a) and (b) of FIG. 16, the RGB sample positions in the source image plane are depicted by circles shaded in different patterns as indicated by the legend at the right end of FIG. 16.

Further, the right sides of (a) and (b) of FIG. 16 depict the pixel array 82 of the distorted image, and one pixel is formed by a set of three RGB circles depicted at diagonally displaced positions. However, only pixels and colors whose values are determined upon sampling in the sampling region depicted on the left side are shaded. As indicated on the left side, the example of FIG. 16 depicts a situation where sampling regions 80a and 80b are set for the individual 4×4 G sample positions. However, the sides of the sampling regions 80a and 80b are determined to join the G sample positions, and the right side and the lower side do not contain the G sample positions.

That is, in a coordinate system where integers are assigned in ascending order at rightward and downward sample positions as depicted in FIG. 16, the range Ra of the sampling region 80a in (a) is G(0,0)≤Ra<G(3,3), and the range Rb of the sampling region 80b in (b) is G(3,0)≤Rb<G(6,3). When it is assumed that the RGB sample positions of the individual pixels of the distorted image in the source image plane disperse in a substantially horizontal direction from left in the order of R, G, and B, the R sample positions deviate from the left end of the sampling region 80a, and the G and B sample positions deviate from the right end.

Consequently, in the pixel array 82 of the distorted image depicted on the right side of (a), pixels whose R values are not defined (e.g., pixel 84) are generated at the left end of a pixel block, and pixels whose G and B values are not defined (e.g., pixel 86) are generated at the right end of the pixel block. However, the G and B values of the same pixel 86 are sampled in the sampling region 80b, which is located right next to the sampling region 80a and is to be computed next. Even when a sampling region is segmented by the sample positions of one color as described above, an adjacent sampling region compensates for the pixel values of a deviated color. Therefore, the RGB values of all the pixels are eventually determined.

In the above example, the boundary of the sampling region is determined in reference to the distribution of the G sample positions. However, the boundary may alternatively be set in reference to the distribution of the R or B sample positions. In any case, when the boundary of the sampling region is determined by the sample positions of a single color, no sampling regions overlap due to color differences in the distribution of sample positions as indicated in (a) of FIG. 13. As a result, images of consistent quality can be displayed without regard to the division granularity of pixel blocks.

According to the present embodiment described above, an image display system configured to view an image through an eyepiece performs sampling from the plane of an undistorted image with no color shift in order to generate a display image that is color-shifted and distorted in consideration of chromatic aberration. Hence, even in a case where a high-quality image is to be displayed by ray tracing, R, G, and B rays need not be individually tracked. As a result, a proper image of each primary color can be generated with low latency without additionally imposing a threefold load on highly-loaded processing.

Further, the display image is divided into pixel blocks according to the parallel processing performance of the GPU, and the distribution of pixels whose pixel values are to be actually computed is selectively determined in reference to the distribution of the sample positions of the pixel blocks. The processing is allowed to progress by the individual pixels, so that the pixel values of each pixel block can be determined in a short process cycle and by fast memory access. Furthermore, the sizes of the pixel blocks and the number of computation target pixels are optimized according to, for example, the properties of the eyepiece, the content of the display image, the presence of the edge, and the region of interest of the user. Consequently, a high-quality video experience can be provided effectively in terms of user recognition while the load on the processing is reduced.

The present invention has been described in reference to the foregoing embodiment. It will be understood by persons skilled in the art that the foregoing embodiment is illustrative and not restrictive, the combination of components and processes described in conjunction with the foregoing embodiment may be variously modified, and such modifications also fall within the scope of the present invention.

REFERENCE SIGNS LIST

100: Head-mounted display
200: Image generation device
222: CPU
224: GPU
226: Main memory
234: Storage section
236: Output section
254: Object model storage section
256: Aberration information storage section
260: Input data acquisition section
261: Viewpoint information acquisition section
262: Space construction section
264: View screen setting section
266: Distorted-image generation section
268: Output section
270: Sample position acquisition section
272: Computation target pixel determination section
274: Positional relation storage section
276: Pixel value computation section
278: Pixel value storage section
280: Sampling section
282: Distorted-image storage section

INDUSTRIAL APPLICABILITY

As described above, the present invention is applicable, for example, to various information processing devices, such as a head-mounted display, a game console, an image display device, a mobile terminal, and a personal computer, and to an image processing system including one of the above information processing devices.

The invention claimed is:

1. An image generation device that, for viewing through an eyepiece, generates a distorted image by subjecting a display target image to a change opposite to a change caused by aberration of the eyepiece, the image generation device comprising:
   a pixel value computation section that obtains position coordinates of computation target pixels that are preset in a source image plane that has not yet been subjected to the opposite change, and that calculates pixel values of each of the computation target pixels of the source image plane;
   a sampling section that determines pixel values of the distorted image by applying interpolation to the calculated pixel values of the source image plane and sampling each primary color of the calculated pixel values to obtain sampling positions of each primary color in the source image plane at different positions in reference to chromatic aberration of the eyepiece;
   a positional relation storage section that stores a correspondence between the sampling positions of each primary color in the source image plane and the position coordinates of the computation target pixels, wherein:
   the pixel value computation section obtains the position coordinates of the computation target pixels stored in the positional relation storage section, and the sampling section samples each primary color by applying interpolating to the calculated pixel values of the corresponding computation target pixels of the source image plane.

2. The image generation device according to claim 1, further comprising:
a sample position acquisition section that acquires, for each primary color, sample positions corresponding to pixels included in each of a plurality of pixel blocks obtained by dividing the distorted image into the plurality of pixel blocks of a predetermined size; and
a computation target pixel determination section that sets one or more sample regions for the sample positions in each of the plurality of pixel blocks in accordance with predetermined rules, and disposes the computation target pixels in the one or more sampling regions in accordance with predetermined rules.

3. The image generation device according to claim 2, wherein the computation target pixel determination section disposes, in each of the pixel blocks, the computation target pixels that are equal in number to a number obtained by multiplying the number of parallel computations performable in the pixel value computation section by a natural number.

4. The image generation device according to claim 2, wherein the pixel value computation section performs an image edge detection process in the sampling region in reference to the pixel values of the computation target pixels, and when an edge exists, adds additional computation target pixels to the sampling region and then newly obtains the pixel values.

5. The image generation device according to claim 4, wherein, according to a position of an edge in the sampling region, the pixel value computation section changes density of additional computation target pixels to be added.

6. The image generation device according to claim 4, wherein the pixel value computation section acquires information regarding a gaze point of a user viewing a display image, adds the additional computation target pixels to the sampling region corresponding to a region of interest within a predetermined range from the gaze point, and obtains the pixel values.

7. The image generation device according to claim 2, wherein the computation target pixel determination section sets, as the sampling region, an inside of a bounding rectangle containing the sample positions of all primary colors corresponding to the pixel blocks.

8. The image generation device according to claim 2, wherein the computation target pixel determination section sets a boundary of the sampling region in reference to the distribution of the sample positions of a predetermined primary color corresponding to the pixel blocks.

9. The image generation device according to claim 1, wherein the pixel value computation section performs ray tracing to obtain the pixel values of the computation target pixels.

10. An image generation method used for viewing through an eyepiece by an image generation device that generates a distorted image by subjecting a display target image to a change opposite to a change caused by aberration of the eyepiece, the image generation method comprising:
obtaining position coordinates of computation target pixels that are preset in a source image plane that has not yet been subjected to the opposite change, and that calculates pixel values of each of the computation target pixels of the source image plane;
determining pixel values of the distorted image by applying interpolation to the calculated pixel values of the source image plane and sampling each primary color of the calculated pixel values to obtain sampling positions of each primary color in the source image plane at different positions in reference to chromatic aberration of the eyepiece;
storing a correspondence between the sampling positions of each primary color in the source image plane and the position coordinates of the computation target pixels, wherein:
the obtaining includes obtaining the position coordinates of the computation target pixels stored in the positional relation storage section, and
the sampling include sampling each primary color by applying interpolating to the calculated pixel values of the corresponding computation target pixels of the source image plane.

11. A non-transitory, computer readable storage medium containing a computer program, which when executed by a computer, causes the computer to facilitate viewing through an eyepiece and to generate a distorted image by subjecting a display target image to a change opposite to a change caused by aberration of the eyepiece, the computer program causing the computer to carry out actions, comprising:
obtaining position coordinates of computation target pixels that are preset in a source image plane that has not yet been subjected to the opposite change, and that calculates pixel values of each of the computation target pixels of the source image plane;
determining pixel values of the distorted image by applying interpolation to the calculated pixel values of the source image plane and sampling each primary color of the calculated pixel values to obtain sampling positions of each primary color in the source image plane at different positions in reference to chromatic aberration of the eyepiece;
storing a correspondence between the sampling positions of each primary color in the source image plane and the position coordinates of the computation target pixels, wherein:
the obtaining includes obtaining the position coordinates of the computation target pixels stored in the positional relation storage section, and
the sampling include sampling each primary color by applying interpolating to the calculated pixel values of the corresponding computation target pixels of the source image plane.

* * * * *